US012182133B2

(12) United States Patent
Smith et al.

(10) Patent No.: US 12,182,133 B2
(45) Date of Patent: *Dec. 31, 2024

(54) APPARATUS AND METHODS FOR TRACKING PROGRESSION OF MEASURED PHENOMENA

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,844

(22) Filed: Oct. 11, 2023

(65) Prior Publication Data

US 2024/0370445 A1    Nov. 7, 2024

Related U.S. Application Data

(63) Continuation of application No. 18/141,827, filed on May 1, 2023, now Pat. No. 11,874,843.

(51) Int. Cl.
*G06F 16/20* (2019.01)
*G06F 3/0482* (2013.01)
*G06F 16/2457* (2019.01)

(52) U.S. Cl.
CPC ...... *G06F 16/24575* (2019.01); *G06F 3/0482* (2013.01); *G06F 16/24578* (2019.01)

(58) Field of Classification Search
None
See application file for complete search history.

(56) References Cited

U.S. PATENT DOCUMENTS

| 9,345,930 B2 * | 5/2016 | Hoffman | G06F 1/1698 |
| 2010/0227302 A1 * | 9/2010 | McGilvery | A61B 5/024 434/236 |
| 2021/0335498 A1 | 10/2021 | Kulkarni | |

FOREIGN PATENT DOCUMENTS

| WO | 2019/246239 A1 | 12/2019 |
| WO | 2022/233421 A1 | 11/2022 |

* cited by examiner

*Primary Examiner* — Belix M Ortiz Ditren
(74) *Attorney, Agent, or Firm* — Caldwell Intellectual Property Law

(57) ABSTRACT

An apparatus and method for providing a performance data output for a user is provided. Apparatus may include a computing device including a processor, which may receive a user datum and generate an interface query data structure including at least a query including an input field based on the user datum. The interface query data structure may configure a remote display device to display the input field to the user, receive at least a user-input datum into the input field, retrieve data describing attributes of the user from a database communicatively connected with the processor, and refine the interface query data structure based on data describing attributes of the user from the database. The processor may use a machine learning model including a classifier to correlate the user datum to the interface query data structure and data multipliers into a list and accordingly generate a strategy data.

20 Claims, 9 Drawing Sheets

FIG. 1C

- 100C
- 104C — Personal Performance Data Assessment and Strategy Development
- 108C — Entry of Specific Interests
- 112C — Indicate a preferred method of progression in your chosen area of interest:
- 116C — ☐ Progressive Resistance Overload
- 120C — ☐ Cardiovascular Exercise
- 124C — ☐ Stretching & Increased Flexibility
- 128C — ☐ Muscle Recovery
- 132C — ☐ Yoga, Mindfulness & Breathwork

FIG. 1B

- 100B
- 104B — Personal Performance Data Assessment and Strategy Development
- 108B — Area of Focus Selection
- 112B — Indicate an area desired for performance improvement by selecting from one of the below options:
- 116B — ■ Physical Fitness and Personal Training
- 120B — ☐ Workflow and Time Management
- 124B — ☐ Increasing Educational Attainment
- 128B — ☐ Training for a Sport
- 132B — ☐ Increasing Management Capabilities

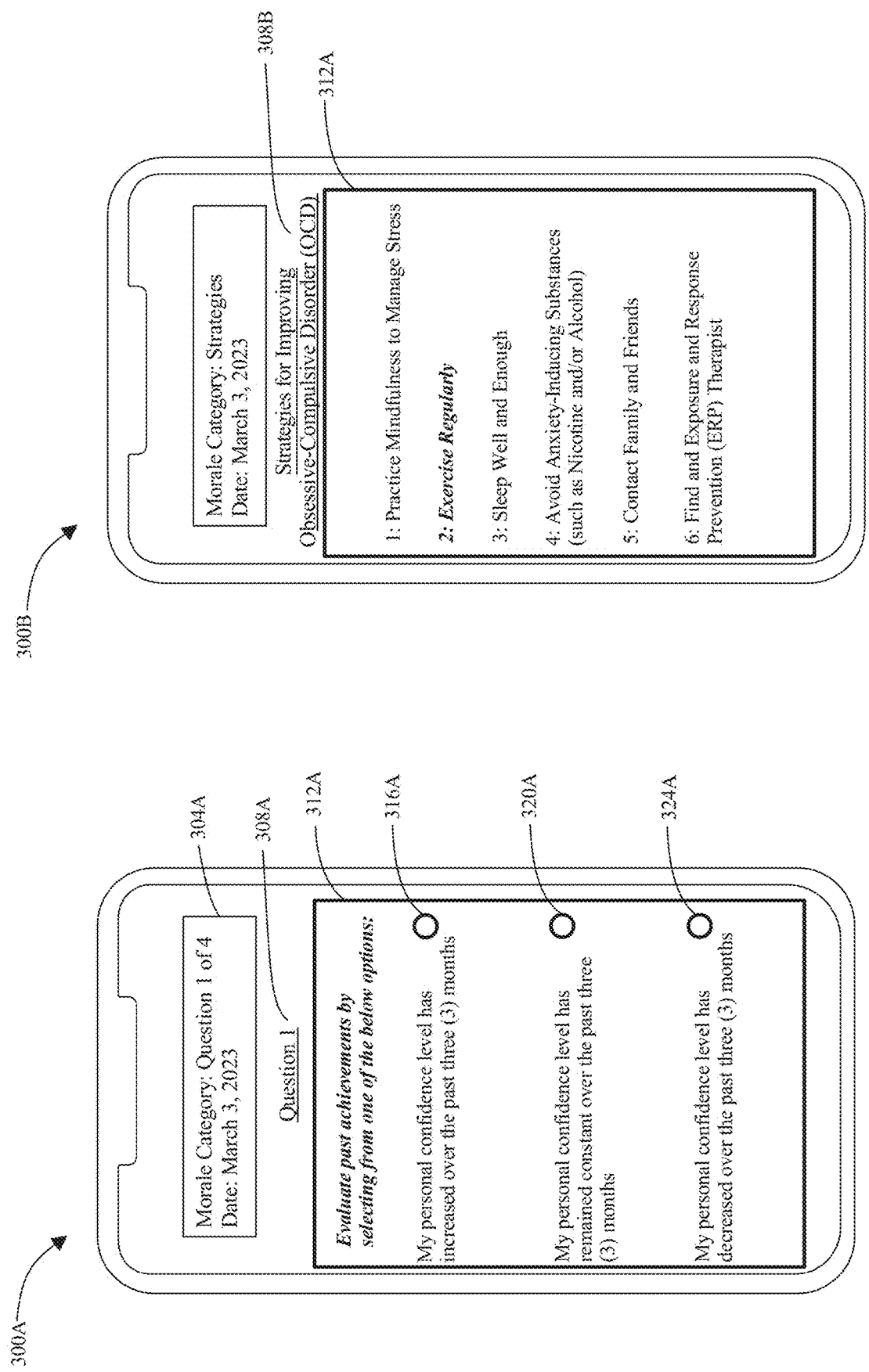

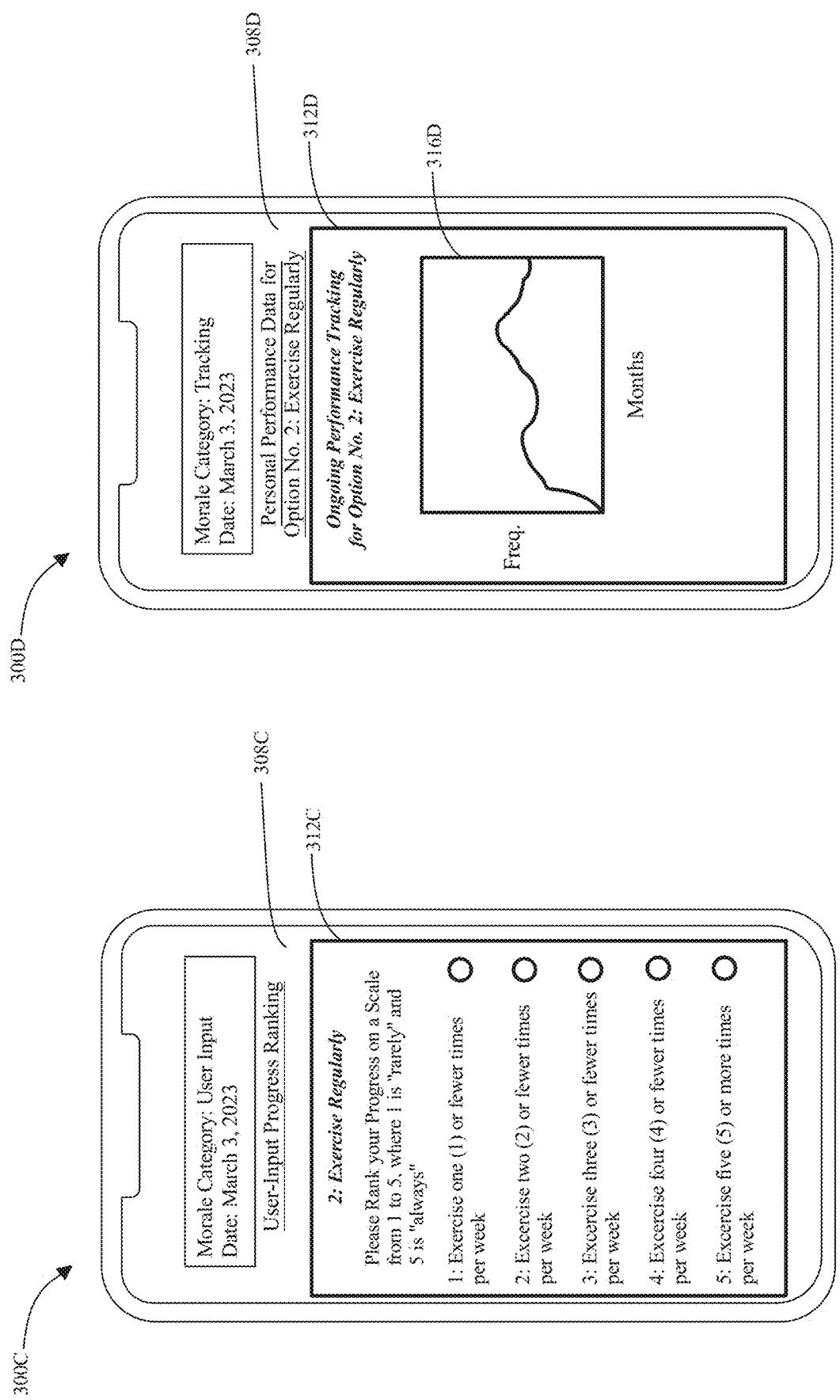

APPARATUS AND METHODS FOR TRACKING PROGRESSION OF MEASURED PHENOMENA

CROSS-REFERENCE TO RELATED APPLICATIONS

This application is a continuation of Non-provisional application Ser. No. 18/141,827, filed on May 1, 2023, and entitled "APPARATUS AND METHODS FOR TRACKING PROGRESSION OF MEASURED PHENOMENA," the entirety of which is incorporated herein by reference.

FIELD OF THE INVENTION

The present invention generally relates to the field of strategic coaching for entrepreneurs. In particular, the present invention is directed to an apparatus and methods for data processing relating to providing a personal performance data output for improving a confidence level of a user.

BACKGROUND

It can be difficult to track progress of a measured phenomenon toward a target. Prior programmatic attempts to resolve this issue have suffered from inadequate user-provided data intake and processing capabilities.

SUMMARY OF THE DISCLOSURE

In an aspect, an apparatus for generating a performance data output indicative of progression of a measured phenomenon toward matching a target is provided. The apparatus includes at least a processor and a memory communicatively connected to the at least a processor and contains instructions configuring the at least a processor to receive a user datum, receive at least a first user-input datum into an input field of at least a query of an interface query data. The memory containing instructions configuring the at least a processor to generate an interface query data structure comprising at least a query comprising an input field based on the user datum, wherein the interface query data structure configures a remote display device to display the input field to a user. The memory containing instructions configuring the at least a processor to generate multiple data multipliers based on the first user-input datum, wherein each data multiplier includes multiple data values including relatively higher data values describing data indicative of progress of the user toward matching a target and score multiple data multipliers as a function of the user datum and the first user input datum, identify a maximum value of at least an element of the at least some data multipliers, generate strategy data for the user based on the first user-input datum, relatively higher data values, and the ordered list, wherein one or more strategies are generated, each corresponding to the progress of the user matching the target, the strategy data is generated in response to a data multiplier instruction defined as multiplying at least the first user-input datum by relatively higher data values and displaying feedback to the user according to the ordered list, the one or more strategies of the strategy data is ranked to determine the highest relevancy of matching the target. The interface query data structure configures the remote display device to display at least the strategy data and receive a second user-input datum through the remote display device corresponding to at least some aspects of the strategy data.

In another aspect, a method for tracking progress of measured phenomena is provided. The method includes receiving, by at least a processor, a user datum, receiving, by the at least a processor, at least a first user-input datum into an input field of at least a query of an interface query data. The method further includes generating, by the at least a processor, an interface query data structure comprising at least a query comprising an input field based on the user datum, wherein the interface query data structure configures a remote display device to display the input field to a user. The method further includes generating, by the at least a processor, multiple data multipliers based on the first user-input datum, wherein each data multiplier includes multiple data values including relatively higher data values describing data indicative of progress of the user toward matching a target and scoring, by the at least a processor, the multiple data multipliers as a function of the user datum and the first user input datum, identifying, by the at least a processor, a maximum value of at least an element of the at least some data multipliers, generating, by the at least a processor, one or more strategies, each corresponding the progress of the user to matching the target, generating, by the at least a processor, strategy data for the user based on the first user-input datum, relatively higher data values, and the ordered list, wherein the strategy data is generated in response to a data multiplier instruction defined as multiplying at least the first user-input datum by relatively higher data values and displaying feedback to the user according to the ordered list and ranking, by the at least a processor, the one or more strategies of the strategy data to determine the highest relevancy of matching the target. The interface query data structure configures the remote display device to display at least the strategy data and receive a second user-input datum through the remote display device corresponding to at least some aspects of the strategy data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 1B-1C are diagrammatic representations of multiple exemplary embodiments of a user input field as displayed by a display device of the apparatus of FIG. 1A;

FIGS. 3A-3D are diagrammatic representations of multiple exemplary embodiments of output generated by an interface query data structure;

DETAILED DESCRIPTION

Figure 1A:
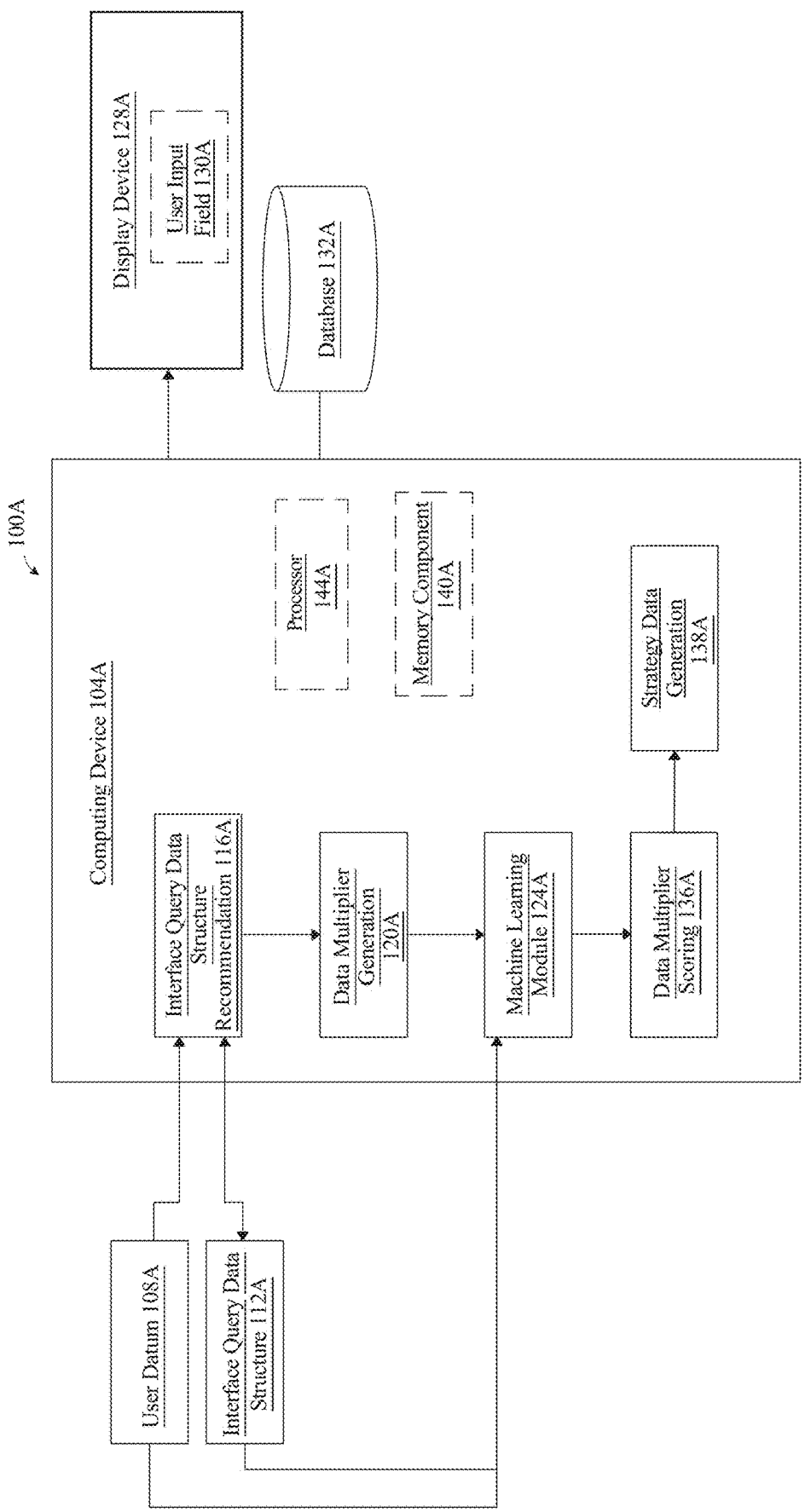
FIG. 1A is a block diagram of an embodiment of an apparatus for tracking progress of measured phenomena.

At a high level, aspects of the present disclosure are directed to an apparatus and methods for tracking progress of measured phenomena toward a target. For convenience of understanding, application of such apparatus and methods to data processing relating to providing a personal performance data output for improving a confidence level of a user are provided, but it is to be understood that such exemplars are intended as non-limiting illustrations of a more generalized technical process. Described processes are executed by a computing device including a processor. Monitoring user performance over a specified duration can be advantageous to a user throughout a performance improvement or enhancement process. For example, and without limitation, extracting information relevant to a user's particular goals may allow the user to receive strategic guidance tailored to their goals on an on-going basis and provide for periodic self-evaluation. Generation of such guidance for the user may be based on user responses to interface query data structures (e.g., that may appear to the user in the form of one or more text-based or other digital media-based surveys, questionnaires, lists of questions, examinations, descriptions, etc.) including questions generated from multiple distinct categories, including "morale," "momentum," "motivation," and one or more multipliers, which increase the proportionate weight attributed to any one selected category relative to the other remaining categories. For example, in the morale category, questions may be tailored to the history of the user to assess trends in a user's confidence over a specified duration (e.g., the past quarter). Morale category-based questions may include asking a user to evaluate their proudest past achievements. The user may respond to such a request by identifying a past achievement, such as "hiking a strenuous mountain trail over ten miles in length" and subsequently select between various additional forms of questioning, such as selecting that the user "completed the activity with relative ease," or "faced significant difficulty requiring above-expected rest periods or additional food" to further input how the user performed in their identified past achievement. The momentum category may be tailored to assessing the current state of the user's confidence level, such as how likely and/or frequently the user is to again repeat a particular activity leading to a desired achievement in the future. The motivation category may be tailored to assessing what the user sees for themselves regarding their confidence level, such as a type of self-reflection. For example, data describing the user's motivation may be input by the user into the computing device for subsequent assessment in view of the other categories. Example types of user-provided motivational input information can include data describing the user attaining one or more enumerated achievement goals, such as "losing up to fifteen (15) pounds of body fat over the course of several months" or "identifying and eliminating undesirable repetitive behaviors associated with obsessive-compulsive disorder (OCD)".

Aspects of the present disclosure can be used to generate a query including an interface query data structure. An "interface query data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory. Therefore, "interface query data structure," as used herein, refers to, for example, a data organization format used to digitally request a data result or action on the data. In addition, the "interface query data structure" can be displayed on a display device, such as a digital peripheral, smartphone, or other similar device, etc. The interface query data structure may be generated based on received "user data," defined as including historical data of the user. Historical data may include attributes and facts about a user already known. For example, historical data may include data describing personality traits, work history, relationship history, education history, mental history, and/or the like. In some embodiments, interface query data structure questions may be generated by a machine-learning model. As a non-limiting example, the machine-learning model may receive user data and output interface query data structure questions. User-provided responses to the interface query data structure questions may include textual or visual responses to each "categorical question", such responses referred to herein as "interface query data structure data". As used in this disclosure, a "categorical question" is a type of text-based question or other digital media-based question within the interface query data structure questions that related to a particular enumerated category, such as "morale" or "momentum," etc. The categorical question may be at least partially stored as data describing aspects of that category locally on the computing device performing the described processes and/or remotely on a server communicatively connected with the computing device. For example, in one or more embodiments, a categorical question relating to "morale" may inquire into a user's morale during a strenuous physical activity, such as preparing for an outdoor (trail) running race and suffering a significant setback, such as one or more of bone stress injuries (e.g., shin splints), iliotibial band syndrome (IT band), and/or Achilles tendon injuries. More particularly, such a "categorical question" may be posed as: "Please describe your morale after suffering from bone stress injuries and being required to rest and perform light physical therapy for 3 consecutive months. The user may provide a text-based response or upload photos corresponding to a respective question to a computing device running the described processes. For example, the user may respond to this categorical question by inputting a text response of: "I felt extremely disheartened and depressed and no longer wanted to continue any form of a physical training regimen whatsoever" to indicate an extreme morale depletion. Alternatively, the user may input the text response of: "The injury forced me to reflect on running trails using proper form and hill technique by controlling upward and downward bouncing movements, also referred to as a runner's 'gait'." The described processes may accordingly use text-recognition methods to parse through the user-input response to this categorical question to subsequently either suggest completion of additional related categorical questions to further ascertain the nature of the user's end objective or goal, or to develop and present a personal performance improvement plan. In addition, alternative forms of presentation are possible, such as that the categorical question may be posed using a combination of text, video, audio, and other digital media content delivery forms and the user's response may be submitted in a similar or dissimilar form. That is, a video delivered categorical question may be responded to using text, or vice-versa, or the like. Text-recognition, speech-recognition and/or other applicable data processing techniques may be used by the described processes for data processing needs. For example, in one or more embodiments, for imagery entered to the computing device, the processor may use machine-learning processes, such as optical character recognition to assess data received.

Aspects of the present disclosure can also be used to generate multipliers, which may include data describing the next three (3) or more achievements of the user. In addition, the multipliers may be directed to improve, for example, one or more of a pride, confidence and/or excitement of the user by assisting the described processes in providing tailored guidance to the user. For example, if the described data processes receive user input including data relating to mountaineering in the form of, for example, textual entries or digital imagery, the multipliers may effectively "multiply," or increase the digital magnitude or emphasis on, mountaineering relative to other user data relating to other activities, such as scuba diving or surfing. In some embodiments, multipliers may be generated using a machine-learning model, which may generate multipliers using the user data and the interface query data structures. Furthermore, the processor may score the multipliers using the user data and the interface query data structures and present the multipliers in an ordered list based on score. This is so, at least in part, because the described processes may generate at least a strategy for the user to reach their identified future achievement goals based on the interface query data structures and multipliers.

The strategy may include a task or step tailored to the user for them to reach their identified future achievement. For example, for some users, the achievement may be related to addressing mental health disorders, such as obsessive-compulsive disorder. Accordingly, the described processes may generate a strategy, or in some instances multiple strategies, which may include data output in the form of the following example textual phrases: (1) "focusing on progress, not perfection;" (2) "delegation of routine activities;" and, (3) "daily meditation." In addition, the generated strategy may include a task or step tailored to help user reach a particular multiplier. Returning to the earlier example of mountaineering, should the user provide user data and/or responses to surveys (e.g., described by interface query data structures) reflecting interest in mountaineering over other activities, then described processes may generate a strategy suggesting a training program to prepare for certain types of terrain and/or climates, further multiplying interest in mountaineering over other categories. Eventually, in some instances, as user interests may change over time, data describing certain interests may be diminished relative to other interests or eliminated altogether in consideration by the described processes to optimally provide ongoing guidance and feedback tailored to the user's current needs and interests. In some embodiments, the processor may use a machine learning model, such as a classifier, to generate one or more strategies. For example, elements of interface query data structures and multipliers may be classified to a plurality of strategies using a classifier.

In some embodiments, a Graphical User Interface (GUI) provided by a display device is communicatively connected to the processor. Accordingly, aspects of the present disclosure allow for the display device to display one or more strategies generated by the described processes. In addition, the display device may receive user input for each strategy displayed. That is, the user may provide user input to the display device that may include the user ranking their progress with a respective strategy. For example, the described processes may request the user to indicate on a scale from "1" to "5" how they believe are progressing with the provided strategy or strategies, where "1" denotes "rarely" or "poorly" and 5 "always" or "perfectly." Furthermore, the user input may include a description of specific actions a user is taking in response to a strategy, such as how, when, where, and a frequency of a respective action. Accordingly, processor may receive the user input through the display device to track the progress of the user. In some embodiments, the processor may use an inference engine or machine learning to assess the progress of the user and use related data to amend, generate and output new strategies based on user progress. The processor may assess how often/long a user stays on track, what specific actions have the most positive impact, and/or the like. In addition, or the alternative, the processor may assess and recalibrate the strategies on a monthly, quarterly, or yearly basis to output current strategies to the user. Exemplary embodiments illustrating aspects of the present disclosure are described below in the context of several specific examples.

Referring now to FIG. 1A, an exemplary embodiment of apparatus 100A (also referred to in this disclosure as a "performance coaching apparatus" or "apparatus") for processing data relating to providing a personal performance data output for improving a confidence level of a user is illustrated. In one or more embodiments, apparatus 100A includes computing device 104A, which may include without limitation a microcontroller, microprocessor (also referred to in this disclosure as a "processor"), digital signal processor (DSP) and/or system on a chip (SoC) as described in this disclosure. Computing device 104A may include a computer system with one or more processors (e.g., CPUs), a graphics processing unit (GPU), or any combination thereof. Computing device 104A may include a memory component, such as memory component 140A, which may include a memory, such as a main memory and/or a static memory, as discussed further in this disclosure below. Computing device 104A may include a display component, as discussed further below in the disclosure. In one or more embodiments, computing device 104A may include, be included in, and/or communicate with a mobile device such as a mobile telephone or smartphone. Computing device 104A may include a single computing device operating independently, or may include two or more computing device operating in concert, in parallel, sequentially or the like; two or more computing devices may be included together in a single computing device or in two or more computing devices. Computing device 104A may interface or communicate with one or more additional devices, as described below in further detail, via a network interface device. Network interface device may be utilized for connecting computing device 104A to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104A may include but is not limited to, for example, a computing device or cluster of computing devices in a first location and a second computing device or cluster of computing devices in a second location. Computing device 104A may include one or more computing devices dedicated to data storage, security, distribution of traffic for load balancing, and the like. Computing device 104A may distribute one or more computing tasks, as described below, across a plurality of computing devices of computing device 104A, which may operate in parallel, in series, redundantly, or in any other manner used for distribution of tasks or memory between computing devices. Computing device 104A may be implemented using a "shared nothing" architecture in which data is cached at the worker, in an embodiment, this may enable scalability of apparatus 100A and/or computing device 104A.

With continued reference to FIG. 1A, computing device 104A may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104A may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, computing device 104A is configured to receive at least an element of user datum 108A. For the purpose of this disclosure, "user datum" references an element, datum, or elements of data describing historical data of a user (e.g., attributes and facts about a user that are already known including, for example, personality traits, work history, relationship history, education history, mental history, and/or the like). In some embodiments, user datum 108A may be numerically quantified (e.g., by data describing discrete real integer values, such as 1, 2, 3 . . . n, where n=a user-defined or prior programmed maximum value entry, such as 10, where lower values denote relatively less significant achievements and higher values denote relatively more significant achievements). For example, in examples where described processes relate to providing a personal performance data output for improving a confidence level of a user in academia, user datum 108A may equal "3" for a user holding only a high-school diploma, a "5" for a baccalaureate degree, and an "8" for a doctoral or professional degree.

Alternatively, in other examples where described processes relate to improving a confidence level of a user in a professional setting, user datum 108A may equal a "3" for performing slightly beneath (e.g., 20%) an enumerated sales or other output performance target, a "5" for achieving exactly the enumerated sales or other output performance target, an "8" for performing slightly above (e.g., 20%) the enumerated sales or other output performance target, or a "10" for greatly exceeding (e.g., 50%+) the enumerated sales or other output performance target. Other example values are possible along with other exemplary attributes and facts about a user that are already known and may be tailored to a particular situation where performance improvement is sought. For example, in addition to the above-described scenarios relating to academia or business output, user datum 108A may include performance history relating to extreme sports (e.g., mountaineering), interpersonal relationships (e.g., romantic relationships, dating, etc.) and/or the like. In one or more alternative embodiments, user datum 108A may be described by data organized in or represented by lattices, grids, vectors, etc. and may be adjusted or selected as necessary to accommodate particular user-defined circumstances or any other format or structure for use as a calculative value that a person skilled in the art would recognize as suitable upon review of the entirety of this disclosure.

In one or more embodiments, user datum 108A may be provided to or received by computing device 104A using various means. In one or more embodiments, user datum 108A may be provided to computing device 104A by a user, such as a student, working professional, athlete or hobbyist or other person that is interested in increasing and/or improving their performance in a particular area or field over a defined duration, such as a quarter or six months. A user may manually input user datum 108A into computing device using, for example, a graphic user interface (GUI) and/or an input device. For example, and without limitation, a user may use a peripheral input device to navigate the graphic user interface and provide user datum 108A to computing device 104A. Non-limiting exemplary input devices include keyboards, joy sticks, light pens, tracker balls, scanners, tablet, microphones, mouses, switches, buttons, sliders, touchscreens, and the like. In other embodiments, user datum 108A may be provided to computing device 104A by a database over a network from, for example, a network-based platform. User datum 108A may be stored in a database and communicated to computing device 104A upon a retrieval request form a user and/or from computing device 104A. In other embodiments, user datum 108A may be communicated from a third-party application, such as from a third-party application on a third-party server, using a network. For example, user datum 108A may be downloaded from a hosting website for a particular area, such as a meeting group for trail runners, or for a planning group for mountaineering expeditions, or for performance improvement relating to increasing business throughput volume and profit margins for any type of business, ranging from smaller start-ups to larger organizations that are functioning enterprises. In one or more embodiments, computing device 104A may extract user datum 108A from an accumulation of information provided by a database. For instance, and without limitation, computing device 104A may extract needed information from database 132A regarding improvement in a particular area sought-after by the user and avoid taking any information determined to be unnecessary. This may be performed by computing device 104A using a machine-learning model, which is described in this disclosure further below.

At a high level, "a machine-learning model" describes a field of inquiry devoted to understanding and building methods that "learn"—that is, methods that leverage data to improve performance on some set of defined tasks. Machine learning algorithms may build a machine-learning model based on sample data, known as "training data", in order to make predictions or decisions without being explicitly programmed to do so. Such algorithms may function by making data-driven predictions or decisions by building a mathematical model from input data. These input data used to build the machine learning model may be divided in multiple data sets. In one or more embodiments, three data sets may be used in different stages of the creation of the machine-learning model: training, validation, and test sets.

Described machine-learning models may be initially fit on a training data set, which is a set of examples used to fit parameters. Here, training data sets may include interface query data structures including questions at a relatively higher level of generality relating to a user's sought-after area of performance improvement to initially ascertain user preferences prior to initiating subsequent more-detailed questioning relating to milestones associated with favorable progression of the user towards their achievement objectives. For example, in an example of mountaineering, training data may include user-provided responses to basic questioning regarding the user's prior trail hiking, outdoor navigation, and mountain climbing experiences. Interface query data structure questions used to generate or populate training data may include the following: "Please describe whether or not you are able to complete a hike of 7 to 10 miles round trip that is moderately strenuous having a numerical rating of 100-150 as defined by the US National Park Service," or "Please describe whether or not you are able to complete a hike of 7 to 10 miles round trip that has an overall elevation gain of 2,200 feet." User-provided responses may be a "yes" or "no," or include phrases or sentences provided in text format that the described processes may recognize using text-recognition or another applicable data processing technique. User-provided responses may be incorporated into interface query data structure datum 108A to be later iteratively correlated by relative applicability to what is determined to be the user's ultimate performance achievement objective. That is, responses to questions that are more aligned with improvements in mountaineering may be weighted relatively higher by the described processes such that a personal performance improvement data or plan relating to mountaineering is ultimately created and displayed by display device 128. Other types of data sets may also be used by the described processes to determine fit and predictive ability, such as validation data sets and final one or more test data sets. Validation data sets may be incrementally more focused toward an identified particular aspect of the user's goals that emerges as more prominent than others. For example, in mountaineering, the user may be (as determined by iterative responses to interface query data structure questions) more interested in ice climbing than bouldering. This pattern may be observed by the described processes (e.g., by machine learning module 124) by correlating user provided responses to interface query data structure questions with one or more sub-categories within mountaineering, such as those that have emerged from or may be extracted from user-provided responses to one or more iterations of interface query data structure questions. Suitable sub-categories in this example can include, at a minimum, indoor climbing, sport climbing and bouldering, etc.

In one or more embodiments, database 132A may include inputted or calculated information and datum related to improvement in a particular area sought-after by the user. A datum history may be stored in a database 132A. Datum history may include real-time and/or previous inputted interface query data structure 112A and user datum 108A. In one or more embodiments, database 132A may include real-time or previously determined record recommendations and/or previously provided interaction preparations. Computing device 104A may be communicatively connected with database 132A. For example, and without limitation, in some cases, database 132A may be local to computing device 104A. In another example, and without limitation, database 132A may be remote to computing device 104A and communicative with computing device 104A by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104A connects directly, dynamically, and non-hierarchically to as many other computing devices as possible. A "network topology" as used in this disclosure is an arrangement of elements of a communication network. Network may use an immutable sequential listing to securely store database 132A. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Database 132A may include keywords. As used in this disclosure, a "keyword" is an element of word or syntax used to identify and/or match elements to each other. For example, without limitation, a keyword may be "mountaineer" in the instance that a user is looking to prepare for a strenuous expedition in a challenging geographic region, such as the Himalayas or the Karakoram range. In another non-limiting example, a keyword may be "surfer" in an example where the user is seeking to prepare for surfing in, for example, Malibu or various locations in Hawaii. Database 132A may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1A, computing device 104A is further configured to receive user datum 108A, as previously mentioned. For the purposes of this disclosure, "user datum" is historical data of user. Historical data may include attributes and facts about a user already known. For example, personality traits, work history, relationship history, education history, mental history, and the like. User datum 108A may be audio and/or visual information related to the user's personal information, attributes, and/or credentials. For example, user datum 108A may be a video, digital photo, audio file, text, and the like. User datum 108A may include a user's prior record, such as a draft resume, personal address, social security number, phone number, employment history, experience level, education, certification, acquired skills, geographical location, expected compensation, career performance acknowledgements (e.g., awards, honors, distinguishments), photograph of user, sample work product, and/or the like. User datum 108A may be received by computing device 104A by the same or similar means described above. For example, and without limitation, user datum 108A may be provided by a user directly, database, third-party application, remote device, immutable sequential listing, and/or the like. In non-limiting embodiments, user datum 108A may be provided as independent or unorganized facts, such as answers to prompted questions provided by computing device 104A and/or as dependent or organized facts, such as a previously prepared record that the user made in advance. In one or more embodiments, after receiving interface query data structure 112A and/or user datum 108A, computing device 104A may determine interface query data structure recommendation 116A as a function of interface query data structure 112A and/or user datum 108A. For instance, and without limitation, interface query data structure recommendation 116A may include a suggested alteration and/or change, such as an addition or deletion of a portion of previously prepared interface query data structure. In another instance, and without limitation, interface query data structure recommendation 116A may include an automatedly generated record created by computing device 104A. In another instance, and without limitation, interface query data structure recommendation 116A may include instructions and/or directions to user describing a process for creating a new customized interface query data structure, such as a customized interface query data structure for a particular area or field sought for performance improvement. In one or more embodiments, language processing, such as by processor 144A, may be used to identify user-related data from available resources (e.g., publicly accessible mailing addresses, educational and/or job histories, etc.) to replace the user-related data with user-specific data for the user, such as user datum 108A and/or interface query data structure 112A. In addition, interface query data structure 112A may be generated by processor 144A based on user datum 108A and further refined by processor 144A in one or more iterations of the presently disclosed processes. That is, processor 144A may generate interface query data structure 112A based on user-provided responses to interface query data structure recommendation 116A, which may include questions tailored to categories such as morale, momentum, motivation, and multipliers. For this disclosure, "interface query data structure datum" references an element, datum, or elements of data based on user-provided responses to interface query data structure recommendation 116A (e.g., indications of interest in pursuing a particular hobby, interest, pastime, occupation, achievement, goal and/or the like). In some embodiments, interface query data structure 112A may be numerically quantified (e.g., by data describing discrete real integer values, such as 1, 2, 3 . . . n, where n=a user-defined or prior programmed maximum value entry, such as 10, where lower values denote relatively less significant achievements and higher values denote relatively more significant achievements).

User-provided responses to interface query data structures generated by interface query data structure recommendation 116A may be used by processor 144A to generate interface query data structure 112A. For example, in the context of mountaineering, interface query data structure recommendation 116A may initially request the user to input (e.g., by user datum 108A) a range of climbing or bouldering ratings indicative of the user's current skill level (e.g., 5.13 to 5.15 indicative of the "Very Difficult" sub-category of Class 5 routes). Based on user-provided responses to interface query data structure recommendation 116A, processor 144A may initially generate or define interface query data structure 112A as including the user's current skill level as identified. Next, processor 144A may update or revise interface query data structure recommendation 116A to request the user to identify if their intended skill development area encompasses ice climbing, often understood to be a more technical or dangerous form of climbing. Upon receiving an affirmative response from the user, processor 144A may then even further update interface query data structure recommendation 116A to present additional requests for information or clarifications pertaining to ice climbing technical specifics, including (but not limited to) "how steep the ice is," "the ice quality," "the availability of protection," "the technicality of movements," "the length of the route," and/or "availability of rest spots." Then, upon receiving user-provided responses to these specific questions, processor 144A may iteratively update interface query data structure datum. In this way, interface query data structure 112A may be generated based on one or more of textual or visual responses (e.g., provided by user datum 108A and/or responses to interface query data structure recommendation 116A) to each categorical question (e.g., of interface query data structure recommendation 116A) provided by the user. In one or more embodiments, computing device may present interface query data structure recommendation 116A to a user, such as suggest an addition or deletion of a word, phrase, image, or part of an image (collectively referred to in this disclosure as an "object") from a previously prepared interface query data structure, or may automatedly execute record recommendation 116A, such as an automated addition or deletion of an object from a previously prepared interface query data structure automatically generates an iteratively customizable interface query data structure by computing device 104A. In addition, iterations may be either displayed or not displayed to the user and limited, such as by the user, based on a total overall refinement preference for interface query data structure 112A. Interface query data structure recommendation 116A may be presented using, for example and without limitations, using a display of apparatus 100A, as discussed further in this disclosure below.

In one or more embodiments, interface query data structure recommendation 116A may include suggested recommendations for a digital media (e.g., digital videos, digital photos, etc.) interface query data structure or questionnaire. For instance, and without limitation, computing device 104A may be configured to intake and record responses to the digital media interface query data structure or questionnaire. An initial pass may be used by computing device 104A to sort elements of digital media interface query data structures into categories (e.g., morale, momentum, motivation, and multipliers), and a subsequent pass may involve detailed further iterative evaluation of additional digital media-based questioning including selection of subsequent interface query data structure questions based on prior interface query data structure responses. For example, the initial pass may include classifying digital media interface query data structures (e.g., stored in database 132A) based on an image component, an audio component, user datum, or at least identifying user indica. For example, identifying indica could include personal information of user such as a name of user or subject, account number, social security number, telephone number, address, and the like, or usage of key terms, words or phrases representative of an area or field in which the user seeks to improve their performance (e.g., mountaineering or surfing). Processor 144A may then search within database 132A to retrieve and output digital media interface query data structures related to and/or further refining the area or field in which the user seeks to improve their performance. For example, in some embodiments, computing device 104A may utilize a candidate classifier, which may include any classifier used throughout this disclosure, to run an initial pass over the digital media elements of digital media resumes, break down and categorizes such elements before comparing it to target digital media resume.

A "classifier," as used in this disclosure is a machine-learning model, such as a mathematical model, neural net, or program generated by a machine learning algorithm known as a "classification algorithm" that sorts inputs into categories or bins of data, outputting the categories or bins of data and/or labels associated therewith. A classifier may be configured to output at least a datum (e.g., user datum 108A and/or interface query data structure 112A, as well as elements of data produced by described processes) that labels or otherwise identifies a set of data that are clustered together, found to be close under a distance metric, or the like. As used in this disclosure, a "strategy classifier" is a classifier that classifies users to a target strategy or classifies data describing groupings of related strategies in one or more hierarchies, each organized to present strategies (e.g., in visual, audial, and/or textual format, etc.) to the user via display device 128A in, for example, a descending order of relevance to more conveniently assist the user to attain their desired achievement or goal. In some cases, a strategy classifier may include a trained machine-learning model, which is trained using strategy training data. As used in this disclosure, "strategy training data" is a training data that correlates one or more of users and user datum 108A to one or more strategies, groupings of strategies related by common subject matter, and refinements of strategies responsive to user input.

Referring again to FIG. 1A, computing device 104A may be configured to generate one or more strategies corresponding to the user progressing toward their achievement goals by strategy data generation 138A and/or as a function of any training data as discussed in this disclosure and classifying data describing strategies generated by strategy data generation 138A. As used in this disclosure, "strategy data" is data describing one or more tasks or steps tailored to help the user progress towards reaching their enumerated achievement goal. Such strategy data may be generated by computing device 104A performing one or more described processes by, for example, interface query data structure recommendation 116A, data multiplier generation 120A, machine learning module 124A, and data multiplier scoring 136A. In one or more embodiments, described processes may parse through strategy data produced by strategy generation 138A to output, in textual, video, graphic (e.g., charts, tables, etc.) or some other suitable digital media-based format, relating to providing the user a personalized performance improvement plan tailored to reaching their enumerated achievement goals. A classifier may be configured to output at least a datum that labels or otherwise identifies a set of data that are clustered together, found to be close under a distance metric as described below, or the like. Computing device 104A and/or another device may generate a classifier using a classification algorithm, defined as a process whereby a computing device 104A derives a classifier from training data. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1A, computing device 104A may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104A may then calculate a likelihood table by calculating probabilities of different data entries and classification labels. Computing device 104A may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1A, computing device 104A may be configured to generate a classifier using a K-nearest neighbors (KNN) algorithm. A "K-nearest neighbors algorithm" as used in this disclosure, includes a classification method that utilizes feature similarity to analyze how closely out-of-sample- features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1A, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1A, in one or more embodiments, apparatus 100A for providing a performance data output for a user is provided. Apparatus 100A includes processor 144A in computing device 104A, where memory component 140A is communicatively connected to processor 144A. Memory component 140A may contain instructions configuring processor 144A to receive user datum 108A and correspondingly generate interface query data structure 112A including at least a query including an input field (e.g., that may be displayed as user input field 130A by display device 128A) based on user datum 108A. In some instances, interface query data structure 112A is at least partially based on data describing attributes of the user that are retrieved from database 132A including categorical information correlated to a historical range of data, such as over 3 months, or 6 months, etc. At least some attributes retrieved from database 132A describe data relating to motivation of the user defined as a frequency of completing activities related to the strategy data.

More particularly, interface query data structure 112A may be generated based on at least user datum 108A by computer device 104A completing one or more processes or steps. For example, processor 144A of computing device 104A may intake user datum 108A upon, for example, user-provided entry, which may include manually typing text into display device 128A or clicking on interactive icons presented by display device 128A. Processor 144A may then parse, review, or otherwise process user datum 108A to generate a query, and then use the generated query to database 132A and specifically retrieve information from database 132A that is particularly relevant to user datum 108A. For example, should user datum 108A include data describing the user's geographical proximity to a beach and their desire to improve hiking performance for traversing hilly trails near beaches, then processor 144A may retrieve relevant information from database 132A, such as a hiking map of several trails in Laguna Beach, California. That relevant information may then be used to create interface query data structure 112A, which may include a survey having questions presented in textual and/or graphical (e.g., digital photos, etc.) format to the user. The user may then provide input, e.g., a first user-input datum, responsive to prompts presented by interface query structure 112A, iteratively, such that described processes may more narrowly tailor questioning to specifically help the user successfully attain their specific performance improvement goals.

In some embodiments, interface query data structure 112A may generate a query to be displayed in an interface, such as by display device 128A using one or more event handlers for receiving user selections, textual entries, links, images, videos, uploads, etc. In addition, or the alternative, in some instances, interface query data structure 112A may also be tasked with receiving a user response (e.g., a first user-input datum), or one or more separate data structures may be used to store user response related information. In some instances, interface query data structure 112A may be a .PHP or .JSP or similar type of file that may direct display, such as by display device 128A, or user-interaction fields on display device 128A displaying interface query data structure 112.

Accordingly, interface query data structure 112A may configure display device 128A to display user input field 130A to the user, receive at least a first user-input datum into user input field 130A, retrieve data describing attributes of the user from database 132A communicatively connected with the processor, and refine interface query data structure 112A based on data describing attributes of the user from database 132A. In some instances, display device 128A may be positioned remotely from computing device 104A and/or display user input field 130A to the user by a Graphical User Interface (GUI) defined as a point of interaction between the user and display device 128A. In addition, the GUI may display refinements to the interface query data structure based on data describing attributes of the user from database 132A as a second input field (e.g., which may also be displayed in user input field 130A by display device 128A). Memory component 140A contains further instructions configuring processor 144A to generate multiple data multipliers based on the first user-input datum. Each data multiplier may include multiple data values. At least some data multipliers are generated and scored (e.g., in order of relevance to user-provided input regarding the user's achievement objectives) using machine learning module 124A (e.g., which may run any machine learning model described further below). Machine learning module 124A may include a classifier that correlates user datum 108A to the interface query data structure 112A and multiple data multipliers into an ordered list based on score. In addition, or the alternative, in one or more embodiments, the classifier of machine learning model 134A may score or identify at least an element of at least some data multipliers between a minimum value and a maximum value. In some embodiments, a user-input datum (e.g., a second or consecutive user-input datum) includes data describing current preferences of the user and the classifier of the machine learning model is configured to correlate the user datum, a first user-input datum, and the second user-input datum to data describing the target and iteratively generate an ordered list between a minimum value and a maximum value.

Data describing aspects of a user's behavior that more closely matches their objectives for personal performance improvement may be presented (and re-presented) to the user by interface query data structure 112A such that described processes may develop a personal performance data output that accurately matches the user's overall objectives. Further, in some embodiments, the classifier may perform "data collection" from the database 132A, where "data collection" is defined as gathering and measuring data related to at least one targeted variable. In addition, the classifier may classify how a user provides input to interface query data structure 112A to thereby apply multiple data multipliers to input found to be more closely related to the user's overall objectives, thereby further reinforcing and increasing weightage attributed to data describing concepts relevant to the user's overall objectives.

In some instances, machine learning module 124A may use the classifier and classify data describing the frequency of the user completing activities associated with the personal performance data output and update the personal performance data output accordingly. In some instances, machine learning model may use the classifier and classify data describing the frequency of the user completing activities associated with the personal performance data output and update the personal performance data output. More particularly, wherein the performance data output (e.g., graph 316D) may be iteratively updated by a classifier of a machine learning model (e.g., machine learning module 124A). The classifier may classify data describing a frequency of the user completing activities describing progress of the user toward matching a target to strategy data (e.g., content display area 312A). Memory component 140A may contain further instructions configuring processor 144A to generate a strategy data (e.g., by strategy data generation 138A) based on the first user-input datum and multiple data multipliers. The strategy data may include a data multiplier instruction that multiplies at least some data multipliers based on the ordered list. Interface query data structure 112A may configure display device 128A to display the strategy data, receive a second user-input datum through the remote display device corresponding to the strategy data, and provide the personal performance data output as a function of the at least an element of the first user-input datum, the second user-input datum and the data multiplier instruction. In addition, in one or more embodiments, if the second user-input datum demonstrates a dissimilarity to the first user-input datum, the machine learning model iteratively recalculates strategy data (e.g., as displayed in content display area 312A) reflective of the dissimilarity such that strategy data includes data describing relatively more of the second user-input datum than the first user-input datum.

Further, in some instances, the machine learning model may be configured to apply an "information momentum multiplier" to the user datum and/or the interface query data structure, wherein the "information momentum multiplier" is defined by the second user-input datum exceeding a pre-defined numerical threshold. In some instances, processor may update the strategy data based on the second user-input datum at periodic intervals. In addition, or the alternative, in some embodiments, interface query data 112A structure may configure display device 128A to display the personal performance data output as a function of a user data change descriptor generated based on the second user-input datum. In some instances, the first user-input datum and/or the second user-input datum may include at least an element of data describing a user-responsiveness factor defined as a frequency of the user in completing activities associated with the personal performance data output. In addition, machine learning module 124A may perform optical character recognition and process data associated with the first user-input datum and/or the second user-input datum.

Referring now to FIGS. 1B-1C, exemplary embodiments of user input field 130A as displayed by display device 128A are illustrated. For example, screen 100B and screen 100C may be displayed by display device 128A, which may be a "smart" phone, such as an iPhone, or other electronic peripheral or interactive cell phone, tablet, etc. Screen 100B may be an initial screen including multiple fields, including identification field 104B, entry field 108B, instruction field 112B, and multiple interactive user input fields including a first user input field 116B, a second user input field 120B, a third user input field 124B, a fourth user input field 128B, and a fifth user input field 132B. Persons skilled in the art, upon reviewing the entirety of this disclosure, will be aware of various ways in which fewer or additional interactive user input fields may be displayed by screen 100B. Identification field 104B may identify described processes performed by processor 144A of computing device 104A by displaying identifying indicia, such as "Personal Performance Data Assessment and Strategy Development" as shown in FIG. 1B. Entry field 108B may show indicia explaining what type of instructions or questions may be shown in instruction field 112B. Initially, upon entry field 108B may display "Area of Focus Selection" indicative of permitting the user to input their particular area of interest in which personal performance improvement is sought. Multiple interactive user input fields (e.g., which may be an example of user input field 130A) may then pose a query (e.g., a survey of questions as shown in FIG. 1B) to the user for feedback in the form of user-provided input such that described processes performed by processor 144A may progress to screen 100C, which is an incremental narrowing progression of questioning relating to more particularly identifying user aspirations.

Similar to screen 100B, screen 100C may be an example of a subsequent screen including multiple fields, including identification field 104C, entry field 108C, instruction field 112C, and multiple interactive user input fields including a first user input field 116C, a second user input field 120C, a third user input field 124C, a fourth user input field 128C, and a fifth user input field 132C. Persons skilled in the art, upon reviewing the entirety of this disclosure, will be aware of various ways in which fewer or additional interactive user input fields may be displayed by screen 100C. Identification field 104C may identify described processes performed by processor 144A of computing device 104A by displaying identifying indicia, such as "Personal Performance Data Assessment and Strategy Development" as shown in FIG.

1C. Entry field 108B may show indicia explaining what type of instructions or questions may be shown in instruction field 112B. Initially, upon entry field 108C may display "Entry of Specific Interests" indicative of permitting the user to input their particular area of interest in which personal performance improvement is sought. Multiple interactive user input fields (e.g., which may be an example of user input field 130A) may then pose a query (e.g., a survey of questions as shown in FIG. 1C) to the user for feedback in the form of user-provided input such that described processes performed by processor 144A may progress to subsequent screens, each being an incremental narrowing progression of questioning relating to more particularly identifying user aspirations.

Figure 2:
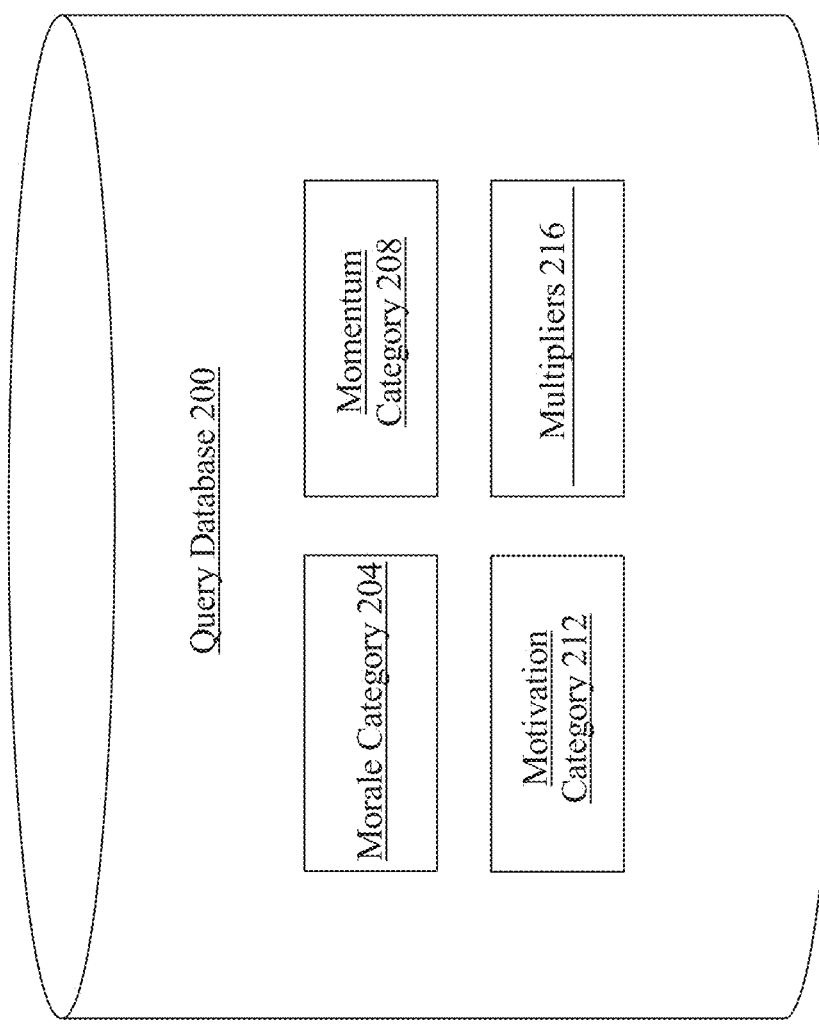
FIG. 2 is a diagrammatic representation of a query database.

Referring now to FIG. 2, an exemplary embodiment of query database 200 is illustrated. In one or more embodiments, query database 200 may be an example of database 132 of FIG. 1. Query database may, as a non-limiting example, organize data stored in the query database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface query data structures relating to obtaining information from the user, times of submission, or the like. Persons skilled in the art, upon reviewing the entirety of this disclosure, will be aware of various ways in which query data from one or more tables may be linked and/or related to query data in one or more other tables. In addition, in one or more embodiments, computing device 104A may be configured to access and retrieve one or more queries from query database 200. Each query may include data describing one or more interface query data structures including questions requesting information relating to specific details for the user progressing toward their achievement goals.

Still referring to FIG. 2, one or more database tables in query database 200 may include, as a non-limiting example, morale category 204, which may be used to store records indicating interface query data structures including data describing questions relating to morale of the user, or the like. Data describing interface query data structures and/or related interface query data structure questions may be accessed from query database 200 to be processed by computing device 104A and output by display device 128 in the form of text, digital videos, digital photos and/or the like. Example types of morale questions or interface query data structures can include one or more of the following as relating to a particular aspiration, achievement, or goal (e.g., mountaineering): "please quantify your confidence level from 1-10 after slipping from an artificial climbing hold, with "1" being devastated to "10" being unperturbed;" "please describe your ideal expedition aspirations over the next quarter," "please indicate your climbing mentors," and/or "please describe your training discipline to prepare to climb the Karakoram range" and/or the like.

As described here, questions may quantifiable or non-quantifiable. Questions that are non-quantifiable may be recognized by audiovisual speech recognition (AVSR) processes to recognize verbal (e.g., dictation) content as described here or other processes for subsequent data retention, storage, and processing by computing device 104. One or more tables may also include a momentum category 208, which may store data describing momentum related questions or interface query data structures. Example types of momentum questions or interface query data structures can include one or more of the following as relating to a particular aspiration, achievement, or goal (e.g., mountaineering): "please quantify your energy level from 1-10 after slipping from an artificial climbing hold, with "1" being fully depleted to "10" being unperturbed; and/or "please describe your training discipline relating to strength, force and drive for preparing to climb the Karakoram range" and/or the like. In addition, one or more tables may include motivation category 212, which may store data describing motivation related questions or interface query data structures. Example types of motivation questions or interface query data structures can include one or more of the following as relating to a particular aspiration, achievement, or goal (e.g., mountaineering): "please quantify your energy level from 1-10 after slipping from an artificial climbing hold, with "1" being fully depleted to "10" being unperturbed; and/or "please describe your training discipline relating to strength, force and drive for preparing to climb the Karakoram range" and/or the like. In addition, one or more tables may include motivation category 212, which may store data describing momentum related questions or interface query data structures. Example types of morale questions or interface query data structures can include one or more of the following as relating to a particular aspiration, achievement, or goal (e.g., mountaineering): "please describe the reason or reasons you have for acting or behaving in a particular way relating to mountaineering;" "please describe your desire or willingness to progress in mountaineering skill level;" or "please describe the strongest motivational factor out of (1) incentives; (2) fear; (3) power, or (4) social accolades" and/or the like.

In an embodiment, and still referring to FIGS. 1 and 2, computing device 104A may be configured to access, categorize, and/or sort data describing any one or more of morale category 204, momentum category 208, and/or motivation category 212 for further manipulation by multipliers 216, which may be as described earlier with relation to data multiplier scoring 136. As used in this disclosure, a "data multiplier" is a calculative tool used for measuring how important one type of data is to another type within described processes performed by computing device 104A of FIG. 1. For instance, multiplier 216 may store one or more multiplicative data values, such as "3×", "5×" and/or the like, where each multiplicative data value may be accessed during data multiplier scoring 136A by computing device 104. Multiplier data from multipliers 216 may thereby proportionately increase weightage or attribution to a particular form of guidance based on, for example, user datum 108A and/or interface query data structure 112A such that the described processes will output personal performance data relating to the user's areas of interest.

In one or more embodiments, computing device 104A may generate data multipliers to multiply data describing user-provided responses to interface query data structure recommendation 116A to, for example, proportionately increase weight or consideration provided to areas or fields identified by the user as being of particular interest or significance. For example, should interface query data structure recommendation 116A be initially provided at a high-level relating to sports and recreation, such as requesting the user "to indicate what outdoor activities they wish to participate in and improve their performance in over time," the user may provide a variety of responses, the majority of which may focus on mountaineering with the balance on other activities, such as surfing, swimming, rowing, snowboarding, skiing and/or the like. Data multiplier generation 120A may proportionately increase emphasis placed on mountaineering relative to the other activities based on, for example, a pre-set numerical multiplicative value (e.g., "1.8×"), meaning that an original response ratio of 50% responses relating to mountaineering with 10% to the other sports, respectively, may be altered by the multipliers to a final ratio of 90% emphasis placed on mountaineering, with an even 2% each across the remaining sports. As a result, processor 144A may thereby elect to retrieve additional digital media interface query data structure content from database 132 relating to mountaineering at a heightened emphasis (e.g., 90%) relative to the original 50%, given that earlier user input indicates a higher interest in that particular sport or activity. The described examples are for illustrative purposes only in that a person skilled in the art would recognize other calculative and/or multiplicative ratios or procedures as suitable upon review of the entirety of this disclosure. Next, machine-learning module 124A may perform data multiplier scoring 136A between user responses to interface query data structure recommendation 116A to organize data multipliers generated in data multiplier generation 120A into an ordered hierarchical list. Returning to the example relating to mountaineering, in one or more non-limiting embodiments, multipliers relating to mountaineering (e.g., in increasing the relative emphasis placed on mountaineering relative to other categories) may be scored higher and placed at a top end of a pre-defined range, e.g., 1-10, where "1" represents no correlation with mountaineering and "10" represents maximum correlation with mountaineering. In addition, in one or more embodiments, multipliers may include data describing the next three (3) or more achievements will improve the pride, confidence, and/or excitement of the user. In the context of mountaineering, this may mean displaying indicia on display device 128 relating to challenging the user further only if they successfully complete certain identified predecessor hikes or climbs, e.g., climbing Mount Blanc prior to climbing Mount Everest or K2. As a result, processor 144A may perform strategy data generation 138A based on interface query data structure 112A and data multiplier generation 120A and/or data multiplier scoring 136.

For the purposes of this disclosure, a "strategy data generation" refers to generation of one or more strategies presented in an ordered hierarchy based on relevancy to the user progressing towards their identified achievement goals. If the user is considering pursuing multiple activities, such as adventure sports hobbies as described above, then strategy data generation 138A may consider and compute strategies based on quantitatively manipulating data describing any one or more of user datum 108, interface query data structure 112, and data multiplier scoring 136. A person skilled in the art would recognize that any particular calculative and/or multiplicative procedure would be suitable upon review of the entirety of this disclosure for processor 144A to complete strategy data generation 138. For example, in one or more embodiments, strategies produced by strategy data generation 138A may be ranked by processor 144A so that the user may determine which strategy is most relevant with attaining their goals. Strategy data generation 138A may include machine-learning processes that are used to calculate one or more strategies, e.g., a set of strategies, each corresponding to assisting the user progress toward attaining their goals.

In one or more embodiments, a machine-learning process may be used to generate one or more strategies relating to improving user performance in an area or field of interest or to generate a machine-learning model for strategy data generation 138. In one or more embodiments, a machine-learning model may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from database 132 and/or as any database described in this disclosure or be provided by the user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output, such as a personal performance data output associated with or otherwise generated by strategy data generation 138, for an input, such as interface query data structure 112A and user datum 108. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

In one or more embodiments, interface query data structure recommendation 116A may include information from interface query data structure 112A and user datum 108A for iteratively revising interface query data structure recommendation 116A and strategy data generation 138. As a result, strategy data generation 138A may provide a one or more strategies responsive to user datum 108A and/or interface query data structure 112. In one or more embodiments, interface query data structure recommendation 116A may include a video component, audio components, text components, and combination thereof, and the like. As used in this disclosure, a "digital media interface query data structure" is an interface query data structure provided in digital media format (e.g., digital videos, digital photos, etc.) to, for example, receive verbal responses to a sequence of targeted questioning relating to a particular area or field in which the user is seeking to improve their performance, such as for a particular activity. In some cases, digital media interface query data structures may include content that is representative or communicative of an at least attribute of a subject, such as a user. As used in this disclosure, a "subject" is a person such as, for example an aspiring alpinist. Subject user may be represented by, for example, their video-recorded verbal responses or by digital photos. For example, in some cases, an image component of a digital media resume may include an image of a subject. As used in this disclosure, an "image component" may be a visual representation of information, such as a plurality of temporally sequential frames and/or pictures, related to video resume and target video resume. For example, image component may include animations, still imagery, recorded video, and the like. Attributes may include subject's skills, competencies, credentials, talents, and the like. In some cases, attributes may be explicitly conveyed within video-recorded responses to a video interface query data structure and/or user-uploaded digital photos. Alternatively, or additionally, in some cases, attributes may be conveyed implicitly within a video interface query data structure or video-recorded responses thereto. Video resume may include a digital video. Digital video may be compressed to optimize speed and/or cost of transmission of video. Videos may be compressed according to a video compression coding format (i.e., codec). Exemplary video compression codecs include H.26x codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

In some cases, computing device 104A may include audiovisual speech recognition (AVSR) processes to recognize verbal content in a video interface query data structure. For example, computing device 104A may use image content to aid in recognition of audible verbal content such as viewing user move their lips to speak on video to process the audio content of video-recorded responses to a vide interface query data structure. AVSR may use image component to aid the overall translation of the audio verbal content of video resumes. In some embodiments, AVSR may include techniques employing image processing capabilities in lip reading to aid speech recognition processes. In some cases, AVSR may be used to decode (i.e., recognize) indeterministic phonemes. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstral coefficient (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is "on camera."

In some cases, computing device 104A may be configured to recognize at least a keyword as a function of visual verbal content. In some cases, recognizing at least keyword may include an optical character recognition (OCR). In some cases, computing device 104A may transcribe much or even substantially all verbal content from video-recorded responses to a video interface query data structure. Alternatively, computing device 104A may use OCR and/or intelligent character recognition (ICR) may recognize written text one glyph or character at a time, for instance by employing machine-learning processes. In some cases, intelligent word recognition (IWR) may recognize written text, one word at a time, for instance by employing machine-learning processes in a variety of user-uploaded digital content, including videos, photos, scans of documents with text and/or the like.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a prior knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

In one or more embodiments, apparatus 100 may further include a memory component 140. Memory component 140 may be communicatively connected to computing device 104A and may be configured to store information and/or datum related to apparatus 100, such as interface query data structure 112, user datum 108, information related to interface query data structure recommendation 116, information related to data multiplier generation 120, and the like. In one or more embodiments, memory component 140 is communicatively connected to processor 144A and configured to contain instructions configuring processor to determine the record recommendation. Memory component 140 may be configured to store information, datum, and/or elements of data related to posting match recommendation. For example, memory component 140 may store previously prepared records (e.g., video recordings of user responses to video interface query data structures, user-uploaded photos, etc.), customized records generated by computing device 104, interface query data structure 112, user datum 108, data multiplier generation 120, interface query data structure recommendation 116, and/or the like. In one or more embodiments, memory component 140 may include a storage device, as described further in this disclosure below.

In one or more embodiments, display device 128 may be communicatively connected to computing device 104. Display device may be remote to computing device or integrated into computing device 104. Communication between computing device 104A and display component may be wired or wireless. In one or more embodiments, display device 128 may be configured to display user datum 108, interface query data structure 112, interface query data structure recommendation 116, data multiplier generation 120, data multiplier scoring 136, data describing database 132, and/or the like. Display device 128 may include a graphic user interface (GUI) that a user may use to navigate through presented data or information by computing device 104. In one or more embodiments, a GUI may include a plurality of lines, images, symbols, and the like to show information and/or data. In addition, the GUI may be configured to provide an articulated graphical display on display device, the articulated graphical display including multiple regions, each region providing one or more instances the point of interaction between the user and the remote display device. In non-limiting embodiments, display device 128 may include a smartphone, tablet, laptop, desktop, monitor, tablet, touchscreen, head-up display (UD), and the like. In one or more embodiments, display device 128 may include a screen such as a liquid crystal display (LCD) various other types of displays or monitors, as previously mentioned in this disclosure. In one or more embodiments, user may view information and/or data displayed on display device 128 in real time. In one or more embodiments, display component may be configured to display received or determined information, which may be toggled through using, for example, an input device of display component or computing device 104. Display device 128 may include electronic components utilized to display image data or information, such as a video, GUI, photo, and the like.

Referring to FIGS. 3A-3D, example output screens 300A-300D displaying output generated by interface query data structure 112A are shown, respectively. As defined earlier, an "interface query data structure" refers to, for example, a data organization format used to digitally request a data result or action on the data (e.g., stored in a database). In one or more embodiments, each output screen 300A-300D may be an example of output screen configured to be displayed by display device 128 of FIG. 1 by interface query data structure 112A. That is, more particularly, interface query data structure 112A may configure display device 128 of FIG. 1 to display any one or more of output screens 300A-300D as described in the present disclosure. Accordingly, output screen 300A may include multiple forms of indicia, including category identification 304A, screen type 308A, content display area 312A, and interactivity components 316A-324A. In one or more embodiments, category identification 304A may include an identification of a category (e.g., selected by processor 144A from query database 200) intended for display for subsequent interaction with the user. For example, output screen 300A may display questions associated with an interface query data structure from a query from morale category 204 of FIG. 2 and thereby display "Morale Category: Question 1 of 4." The described examples are for illustrative purposes only in that a person skilled in the art would recognize the selection of other categories (e.g., including those not listed as exampled in query database 200 of FIG. 2), questions, number of questions, and content delivery type (e.g., textual questions, digital photo interactivity, digital video interactivity, etc.) as suitable upon review of the entirety of this disclosure.

In the example shown by output screen 300A of FIG. 3A, category identification 304A indicates a question number and date. Screen type 308A corresponds with the question number shown in category identification 304A. Referring now to a particular field of interest to a user for improving personal performance (e.g., overcoming OCD), content display area 312A may include, for example, textual questions or phrases relating to evaluation of past achievements. The user may input their selection by touching any one of interactivity components 316A-324A for processor 144A to intake the user's selection and correspondingly iteratively update interface query data structure 112A as described earlier, if needed or preferred. As a result, output screen 300B, which may be displayed in response to user-provided input by touching any one of interactivity components 316A-324A, may include output screen 308B relating to "Strategies for Improving Obsessive-Compulsive Disorder (OCD)." In one or more embodiments, display screen type 308B may include one or more specific strategies (e.g., displayed in content display area 312B) that are tailored to assist the user to attain their specified achievement goal, such as "exercise regularly," and the user may select this option (e.g., by touching it on output screen 308B).

Computing device 104A may then intake, evaluate and/or process user-selection of, for example, data describing "exercise regularly" as a part of one or more of interface query data structure recommendation 116, data multiplier generation 120, machine learning module 124, data multiplier scoring 136A and/or strategy data generation 138A as described earlier. For example, output screen 300C may show display output screen 308C relating to "User-Input Progress Ranking," which may correspond to strategy data generation 136A as described earlier. That is, in one or more embodiments, the user may provide additional input (e.g., relating to ranking of their progress with the suggested strategy) responsive to strategy data generation 138A for additional iterative refinement relating how often or regularly the user adheres to the earlier displayed strategy (e.g., "exercise regularly"). In one or more embodiments, user input may include a description of specific actions a user is taking in response to a strategy, such as how, when, where, and frequency of the action. Input provided by the user in content display area 312C may then be evaluated by described processes performed by processor 144A to show output screen 300D including display screen type 308C with "Personal Performance Data for Option No. 2: Exercise Regularly" and graph 316D included in content display area 312D. Graph 316D may be indicative of data multiplier scoring 136A and/or strategy data generation 138A as performed by processor 144A of FIG. 1. In addition, graph 316D may show user performance, e.g., frequency of weekly exercise visits per month over several months, based on processor 144A receiving user input through display device 128. That is, in one or more embodiments, processor 144A may use an inference engine or machine learning to assess progress of the user and use related data to amend or generate new strategies through strategy data generation 138A based on user progress. In addition, the processor may assess how often/long the user adheres to a suggested strategy, and what specific actions (e.g., exercising 3× per week) have the most positive impact, and the like. In addition, the processor may assess and recalibrate strategies generated by strategy data generation 138A on a periodic basis, e.g., a monthly, quarterly, or yearly basis.

Figure 4:
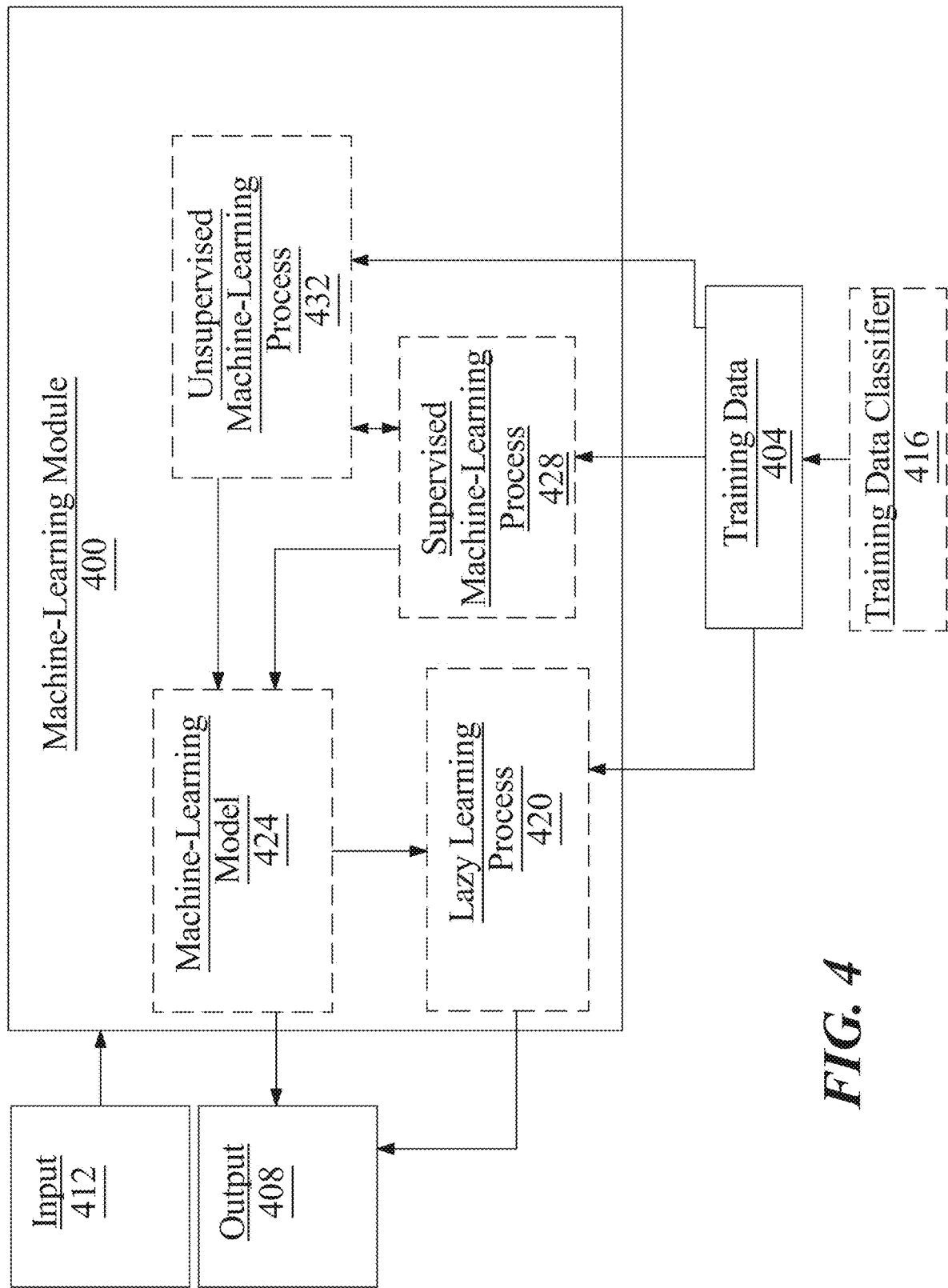
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine learning module 124A of computing device 104A of FIG. 1. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module (e.g., computing device 104A of FIG. 1) to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include user datum 108A and/or interface query data structure 112, which may be at least in part based on user datum 108A to provide a personal performance data output (e.g., graph 316D of FIG. 3D). In one or more embodiments, interface query data structure 112A includes one or more interface query data structures, any one of which may include an interface that defines a set of operations supported by a data structure and related semantics, or meaning, of those operations. For example, in the context of personal performance improvement coaching, interface query data structure 112A may include one or more interface query data structures that may appear to the user in the form of one or more text-based or other digital media-based surveys, questionnaires, lists of questions, examinations, descriptions, etc., any one of which may include categorical questions in one or more discrete categories including morale, momentum, motivation, and multipliers.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to iteratively refine strategies generated by strategy data generation 138A to reflect the user's preferences more accurately for improving their performance to attain their achievement goal. That is, in one or more embodiments, in the context of improving mountaineering skill, training data may include providing multiple medium-grade intensity trails or routes to the user to receive their feedback regarding perceived intensity or difficulty. Such provided routes may be subsequently and iteratively refined based on input user prior performance capabilities, such as hiking prior to climbing in the Himalayas. This input may then be analyzed by machine learning module 124A and allow strategy data generation 138A to generate appropriate strategies. For example, such strategies may be directed to improve user performance based on user responses to queries generated from training data. As a result, more experienced hikers and alpinists will be continually guided and challenged with appropriate feedback generated by strategy data generation 138.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum (e.g., a personal performance data output for improving a confidence level of the user). As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user datum 108A and/or interface query data structure 112A as described above as inputs, graph 316D and/or similar textual and/or visual imagery (e.g., digital photos and/or videos) relating to providing a personal performance data output for improving a confidence level of a user as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
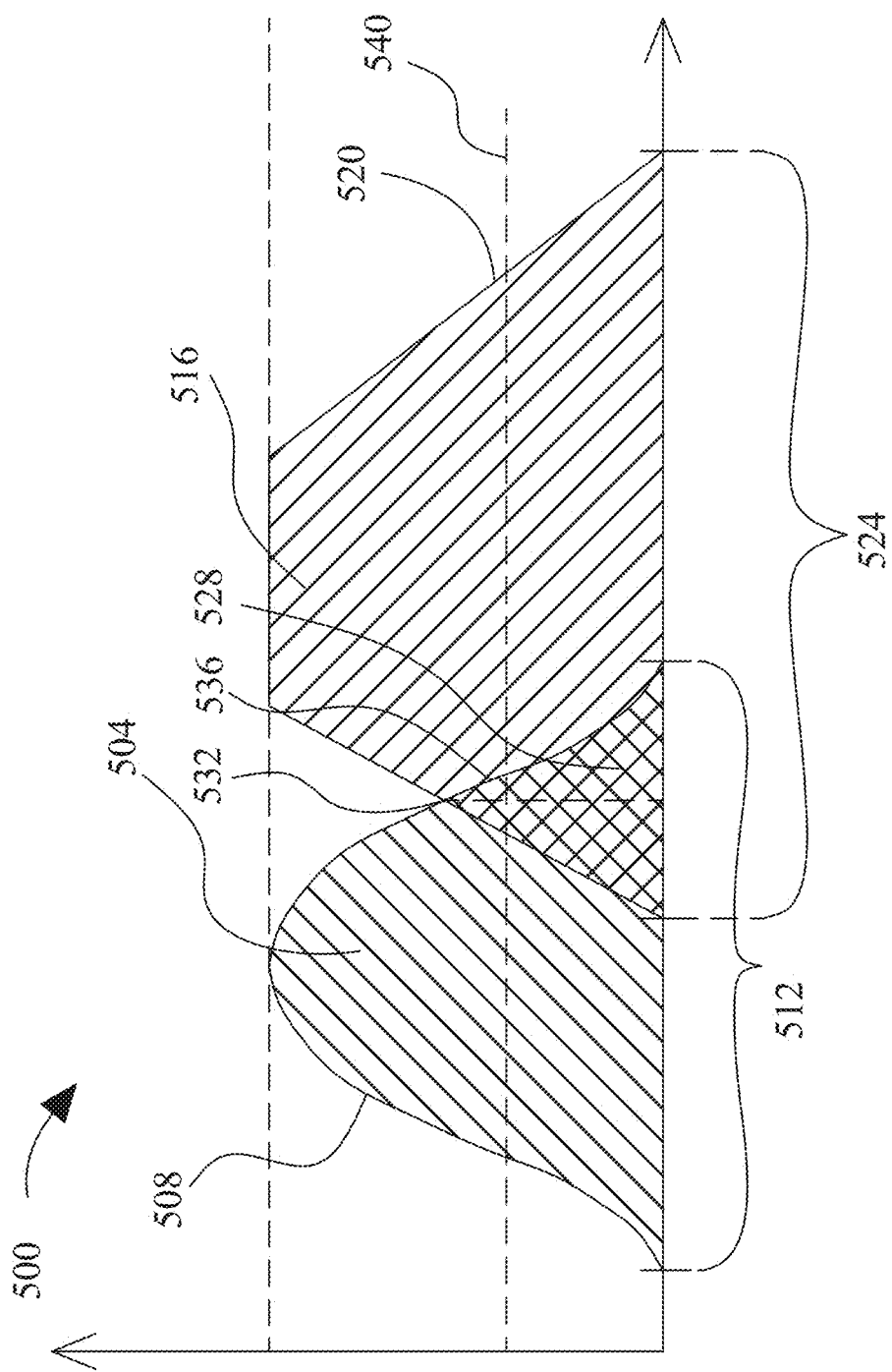
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a personal performance data output (e.g., for improving a confidence level of a user) as performed by processor 144A of computing device 104A may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, user datum 108A and/or interface query data structure 112, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, user datum 108A and/or interface query data structure 112, and a predetermined class, such as without limitation, query data or information including interface query data structures stored in query database 200 of FIG. 2. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or user datum 108A and/or interface query data structure 112 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify user datum 108A and/or interface query data structure 112A with interface query data structure data stored in query database 200. For instance, if a user datum 108A and/or interface query data structure 112A has a fuzzy set matching certain interface query data structure data values stored in query database 200 (e.g., by having a degree of overlap exceeding a threshold), computing device 104A may classify the user datum 108A and/or interface query data structure 112A as belonging to query categorization (e.g., generating strategies by strategy data generation 138A based at least in part on user-provided responses to interface query data structure recommendation 116). Where multiple fuzzy matches are performed, degrees of match for each respective fuzzy set may be computed and aggregated through, for instance, addition, averaging, or the like, to determine an overall degree of match.

Still referring to FIG. 5, in an embodiment, user datum 108A and/or interface query data structure 112A may be compared to multiple query database 200 categorization fuzzy sets. For instance, user datum 108A and/or interface query data structure 112A may be represented by a fuzzy set that is compared to each of the multiple query database 200 categorization fuzzy sets; and a degree of overlap exceeding a threshold between the user datum 108A and/or interface query data structure 112A fuzzy set and any of the multiple query database 200 categorization fuzzy sets may cause computing device 104A to classify the user datum 108A and/or interface query data structure 112A as belonging to one or more corresponding interface query data structures associated with query database 200 categorization (e.g., selection from morale category 204, etc.). For instance, in one embodiment there may be two query database 200 categorization fuzzy sets, representing, respectively, query database 200 categorization (e.g., into each of morale category 204, momentum category 208, motivation category 212, and multipliers 216). For example, a First query database 200 categorization may have a first fuzzy set; a Second query database 200 categorization may have a second fuzzy set; and user datum 108A and/or interface query data structure 112A may each have a corresponding fuzzy set. Computing device 104, for example, may compare an user datum 108A and/or interface query data structure 112A fuzzy set with fuzzy set data describing each of the categories included query database 200, as described above, and classify a user datum 108A and/or interface query data structure 112A to one or more categories (e.g., into each of morale category 204, momentum category 208, motivation category 212, and multipliers 216). Machine-learning methods as described throughout may, in a non-limiting example, generate coefficients used in fuzzy set equations as described above, such as without limitation x, c, and a of a Gaussian set as described above, as outputs of machine-learning methods. Likewise, user datum 108A and/or interface query data structure 112A may be used indirectly to determine a fuzzy set, as user datum 108A fuzzy set and/or interface query data structure 112A fuzzy set may be derived from outputs of one or more machine-learning models that take the user datum 108A and/or interface query data structure 112A directly or indirectly as inputs.

Still referring to FIG. 5, a computing device may use a logic comparison program, such as, but not limited to, a fuzzy logic model to determine a query database 200 response. A query database 200 response may include, but is not limited to, morale category 204, momentum category 208, motivation category 212, and multipliers 216, and the like; each such query database 200 response may be represented as a value for a linguistic variable representing query database 200 response or in other words a fuzzy set as described above that corresponds to a degree of matching between data describing user datum 108A and/or interface query data structure 112A and one or more categories within query database 200 as calculated using any statistical, machine-learning, or other method that may occur to a person skilled in the art upon reviewing the entirety of this disclosure. In some embodiments, determining a query database 200 categorization may include using a linear regression model. A linear regression model may include a machine learning model. A linear regression model may be configured to map data of user datum 108A and/or interface query data structure 112, to one or more query database 200 parameters. A linear regression model may be trained using a machine learning process. A linear regression model may map statistics such as, but not limited to, quality of user datum 108A and/or interface query data structure 112. In some embodiments, determining query database 200 of user datum 108A and/or interface query data structure 112A may include using a query database 200 classification model. A query database 200 classification model may be configured to input collected data and cluster data to a centroid based on, but not limited to, frequency of appearance, linguistic indicators of quality, and the like. Centroids may include scores assigned to them such that quality of user datum 108A and/or interface query data structure 112A may each be assigned a score. In some embodiments, query database 200 classification model may include a K-means clustering model. In some embodiments, query database 200 classification model may include a particle swarm optimization model. In some embodiments, determining the query database 200 of user datum 108A and/or interface query data structure 112A may include using a fuzzy inference engine (e.g., to assess the progress of the user and use said data to amend or generate new strategies based on user progress). A fuzzy inference engine may be configured to map one or more user datum 108A and/or interface query data structure 112A data elements using fuzzy logic. In some embodiments, user datum 108A and/or interface query data structure 112A may be arranged by a logic comparison program into query database 200 arrangement. A "query database 200 arrangement" as used in this disclosure is any grouping of objects and/or data based on skill level and/or output score as defined by, for example, data multiplier scoring 136. This step may be implemented as described above in FIG. 1. Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to user datum 108A and/or interface query data structure 112, such as a degree of matching between data describing user aspirations and strategies based on responses to interface query data structures stored in query database 200. Continuing the example, an output linguistic variable may represent, without limitation, a score value. An inference engine may combine rules, such as: "if the difficulty level of a particular activity (e.g., mountaineering) is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Further referring to FIG. 5, user datum 108A and/or interface query data structure 112A to be used may be selected by user selection, and/or by selection of a distribution of output scores, such as 50% hard/expert, 40% moderate average, and 50% easy/beginner levels or the like. Each query database 200 categorization may be selected using an additional function such as in query database 200 as described above.

Figure 6:
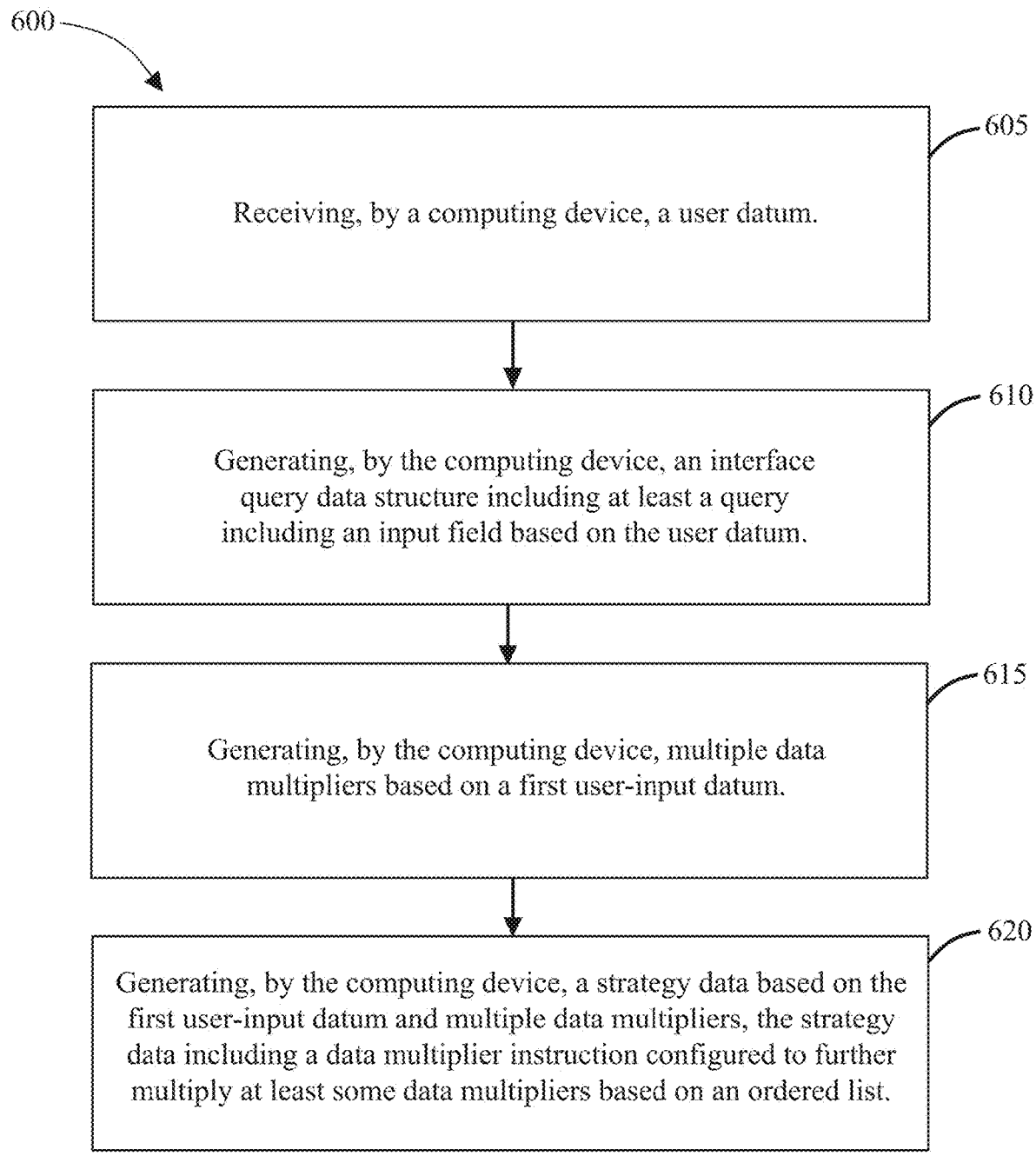
FIG. 6 is a flow diagram of an exemplary method for providing a personal performance data output.

Now referring to FIG. 6, a method 600 for providing a personal performance data output for improving a confidence level of a user is presented. At step 605, method 600 includes receiving, by computing device 104, user datum 108, which may be a query including a survey, questionnaire and/or the like (e.g., generated by strategy data generation 138). In addition, the survey may be a representation of interface query data structure 112A displayed to the user. In one or more embodiments, the survey may include categorical questions in one or more discrete categories including morale, momentum, motivation, and multipliers in areas pertaining to user defined interests, such as that shown and described for FIGS. 1B-1C. In addition, the survey may be generated based on receiving a user data (e.g., user datum 108) and thereby correspondingly retrieved from relevant data in query database 200 of FIG. 2.

For example, the survey may be presented in textual and/or in interactive digital media (e.g., digital video and/or photos) and be selected from one or more categories within query database 200 (e.g., morale category 204, momentum category 208, and/or motivation category 212, etc.). In addition, in one or more embodiments, data describing responses to a may be multiplied by multipliers 216 by data multiplier generation 120A for further data processing and manipulation, etc. This step may be implemented as described above, without limitation, in FIGS. 1-7.

Still referring to FIG. 6, at step 610, method 600 includes generating, by computing device 104, interface query data structure 112A of FIG. 1A, which may include at least a query including an input field (e.g., user input field 130A) based on user datum 108A as shown and described for FIG. 1A. In some instances, user input field 130A may include responses interface query data structure 112 in the form of one or more of textual or visual responses provided by the user to, for example, each categorical question of a survey included in interface query data structure 112A. Interface query data structure 112A may be provided by the user to computing device 104A by any processes and method described earlier (e.g., user-input into a touch-screen interface of a digital peripheral or device, voice and/or video recognition, dictation transcription, etc.). In one or more embodiments, interface query data structure 112A may be used by one or more of interface query data structure recommendation, data multiplier generation 120, machine learning module 124, data multiplier scoring 136A and/or strategy data generation 138A as described earlier. That is, interface query data structure 112A may be used to generate an interface query data structure using interface query data structure recommendation 116, which may access database 132 and/or query database 200 of FIG. 2 to retrieve one or more queries including interface query data structures that, for example, correlate with or match user datum 108. This step may be implemented as described above, without limitation, in FIGS. 1-7.

Still referring to FIG. 6, at step 615, method 600 includes generating, by computing device 104, multiple data multipliers (e.g., multipliers 216) based at least in part on a first user-input datum (e.g., provided in user input field 130A of FIG. 1A) that may include textual or visual responses to each questions posed to the user by interface query data structure 112A. For example, the user may provide a text-based response or upload photos corresponding to a respective question in a interface query data structure such that processor 144A may use machine-learning process such as optical character recognition to assess data received. In addition, in one or more embodiments, each data multiplier may include achievement-related data values. At least one of the data multipliers may be generated using machine-learning module 124, which may be configured to generate data multipliers using user datum 108A and/or interface query data structure 112. For example, data multipliers may be used in data multiplier scoring 136A by processor 144A to emphasize data describing aspirational interests of the user to, for example, more accurately track those interests. As described earlier, data multipliers may be used as multiplicative factors to increase relative emphasis on data describing aspirations of higher interest to the user than other goals or objectives. As a result, data multipliers may be used in data multiplier scoring 136A to, for example, provide a personal performance data output (e.g., graph 316D) tailored specifically to those user interests. This step may be implemented as described above, without limitation, in FIGS. 1-7.

Still referring to FIG. 6, at step 620, method 600 includes generating, by the computing device, a strategy data based on the first user-input datum and multiple data multipliers, the strategy data including a data multiplier instruction configured to further multiply at least some data multipliers based on an ordered list. For example, each data multiplier may include multiple data values and at least some data multipliers may be generated and scored using a machine learning model (e.g., run by machine learning module 124A of FIG. 1A) including a classifier configured to correlate user datum 108A to interface query data structure 112A to correspondingly multiply at least some data multipliers into an ordered list based on the score. In one or more embodiments, the strategy data may describe a task or step for the user to reach a future achievement milestone and/or to assist the user reach a data multiplier. In addition, processor 144A may use machine-learning module 124A including a classifier to generate the strategy data. As a result, elements of the interface query data structure 112A and data multipliers may be optionally classified into strategy data values using the classifier. In addition, or the alternative, strategy data may be generated by strategy data generation 138A as described earlier and be based on processing user datum 108A and/or interface query data structure 112A by, for example, machine learning module 124A and data multiplier scoring 136. In one or more embodiments, strategy data may include data describing one or more particular strategies relating to addressing user-defined achievement goals in, for example, user datum 108A and/or interface query data structure 112. As a result, strategy data may be output in the form of textual summaries, visual depictions (e.g., digital photos, depictions, etc.) tailored to providing a plan for user performance improvement.

For example, in the context of mountaineering, strategy data may include specific training regimens, such as high-altitude climate acclimatization prior to preparatory hikes, stretching routines, dietary recommendations, heart rate tracking and/or the like. In addition, strategy data may be continuously or periodically updated by, for example, any described process performed by processor 144A to, for example, accurately track and guide user goals, which may change over time. That is, a user may initially seek to climb several mountains, but then after achieving this goal, may want to reduce physical intensity to return to only hiking. Strategy data generated by strategy data generation 138A may take this into account, since data multiplier generation 120A may, over time, diminish significance of climbing preferences relative to hiking preferences. Accordingly, data describing climbing relative to hiking will also be proportionately diminished resulting in personal performance data output describing hiking. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
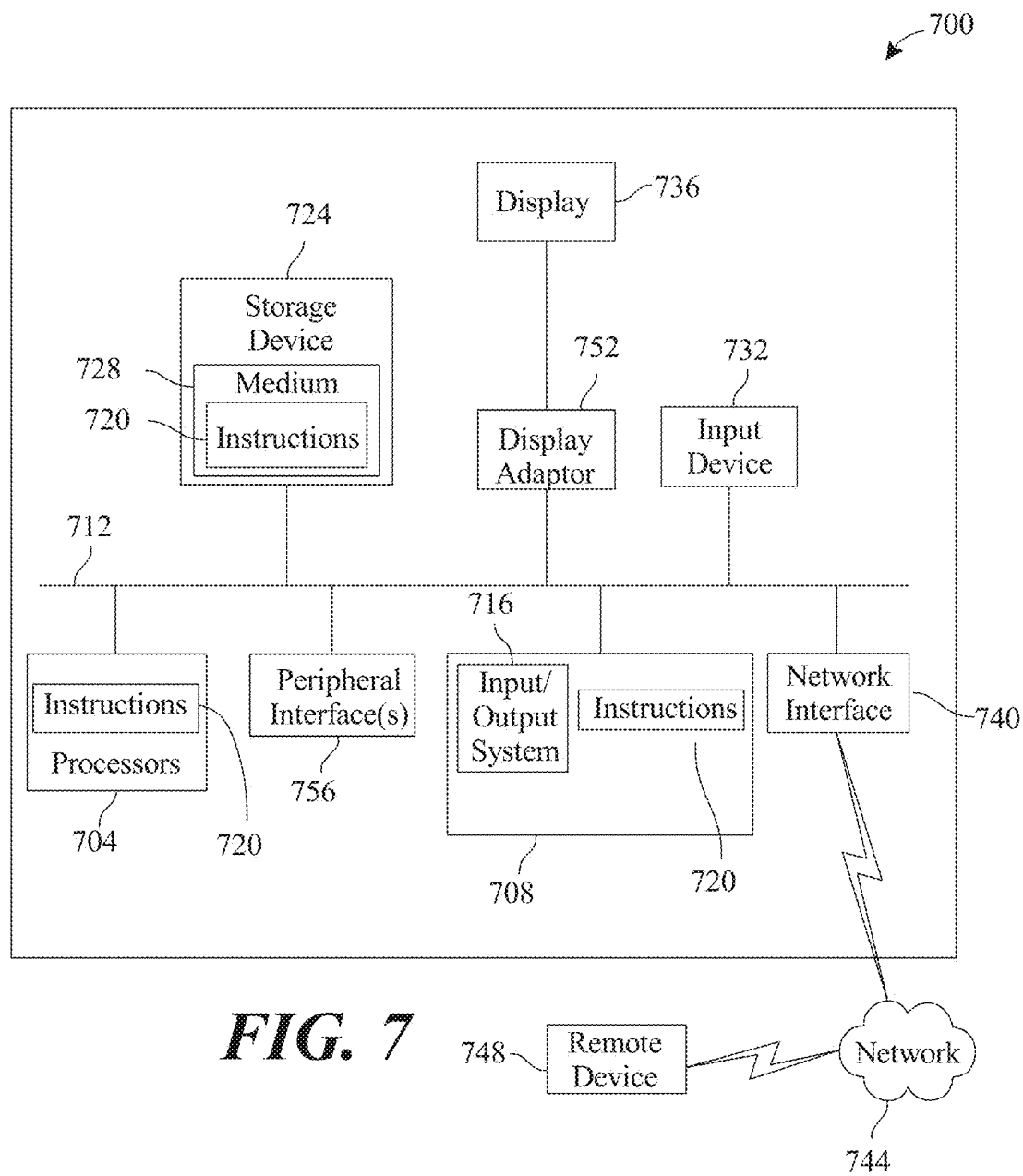
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for tracking progress of measured phenomena, the apparatus comprising:
   at least a processor; and
   a memory communicatively connected to the at least a processor, the memory containing instructions configuring the at least a processor to:
      receive a user datum;
      generate an interface query data structure comprising at least a query comprising an input field based on the user datum, wherein the interface query data structure configures a remote display device to:
         display the input field to a user;
      receive at least a first user-input datum into an input field of at least a query of an interface query data;
      generate multiple data multipliers based on the at least a first user-input datum, wherein:
         each data multiplier comprises multiple data values comprising relatively higher data values describing data indicative of progress of the user toward matching a target;
      score the multiple data multipliers as a function of the user datum and the at least a first user input datum;
      identify a maximum value of at least an element of at least some data multipliers; and
      generate strategy data for the user based on the at least a first user-input datum, the relatively higher data values, and an ordered list, wherein:
         one or more strategies are generated, each corresponding to the progress of the user matching the target;
         the strategy data is generated in response to a data multiplier instruction defined as multiplying the at least a first user-input datum by the relatively higher data values and displaying feedback to the user according to the ordered list;
         the one or more strategies of the strategy data is ranked to determine a highest relevancy of matching the target;
         the interface query data structure configures the remote display device to:
            display at least the strategy data; and
            receive a second user-input datum through the remote display device corresponding to at least some aspects of the strategy data.

2. The apparatus of claim 1, wherein the interface query data structure is at least partially based on data describing attributes of the user that are retrieved from a database comprising categorical information correlated to a historical range of data.

3. The apparatus of claim 1, wherein the memory contains instructions further configuring the at least a processor to apply an information momentum multiplier to the user datum and the interface query data structure using a machine learning model, wherein the information momentum multiplier is defined by a second user-input datum exceeding a pre-defined numerical threshold.

4. The apparatus of claim 1, wherein the memory contains instructions further configuring the at least a processor to determine an interface query data structure recommendation as a function of the interface query data structure and the user datum, wherein the interface query data structure recommendation comprises a record generated by the at least a processor.

5. The apparatus of claim 4, wherein the memory contains instructions configuring the at least a processor to:
   generate the interface query data structure as a function of a user-provided response received from the interface query data structure recommendation that is transmitted to the user; and
   update the interface query data structure recommendation as a function of the user-provided response iteratively through a feedback loop.

6. The apparatus of claim 1, wherein the memory contains instructions configuring the at least a processor to generate a machine-learning model for strategy data generation, wherein the machine-learning model is trained with training data comprising correlations between query data structures, user datums, and performance data outputs of the strategy data generation.

7. The apparatus of claim 1, wherein if the second user-input datum demonstrates dissimilarity to the first user-input datum, a machine learning model iteratively recalculates the strategy data reflective of the dissimilarity such that the strategy data comprises data describing relatively more of the second user-input datum than the first user-input datum.

8. The apparatus of claim 1, wherein the query interface data structure further configures the remote display device to display a performance data output as a function of a user data change descriptor generated based on the second user-input datum.

9. The apparatus of claim 1, wherein the at least a first user-input datum and the second user-input datum comprise at least an element of data describing a user-responsiveness factor defined as a frequency of the user in completing activities associated with a performance data output.

10. The apparatus of claim 1, wherein a performance data output is iteratively updated by a classifier of a machine learning model, which is further configured to classify data describing a frequency of the user completing activities describing a progress of the user toward matching the target to the strategy data.

11. A method for tracking progress of measured phenomena, the method comprising:
   receiving, by at least a processor, a user datum;
   receiving, by the at least a processor, at least a first user-input datum into an input field of at least a query of an interface query data;
   generating, by the at least a processor, an interface query data structure comprising at least a query comprising an input field based on the user datum, wherein the interface query data structure configures a remote display device to:
      display the input field to a user;
   generating, by the at least a processor, multiple data multipliers based on the at least a first user-input datum, wherein:
      each data multiplier comprises multiple data values comprising relatively higher data values describing data indicative of progress of the user toward matching a target;
   scoring, by the at least a processor, the multiple data multipliers as a function of the user datum and the at least a first user input datum;
   identifying, by the at least a processor, a maximum value of at least an element of at least some data multipliers;
   generating, by the at least a processor, one or more strategies, each corresponding the progress of the user to matching the target;

generating, by the at least a processor, strategy data for the user based on the at least a first user-input datum, the relatively higher data values, and an ordered list, wherein:
  the strategy data is generated in response to a data multiplier instruction defined as multiplying the at least the at least a first user-input datum by the relatively higher data values and displaying feedback to the user according to the ordered list; and
  ranking, by the at least a processor, the one or more strategies of the strategy data to determine a highest relevancy of matching the target, the interface query data structure configures the remote display device to:
    display at least the strategy data; and
    receive a second user-input datum through the remote display device corresponding to at least some aspects of the strategy data.

12. The method of claim 11, further comprising:
retrieving, by the at least a processor, attributes of the user from a database comprising categorical information correlated to a historical range of data, wherein the interface query data structure is at least partially based on the data describing attributes of the user.

13. The method of claim 11, further comprising:
applying, by the at least a processor, an information momentum multiplier to the user datum and the interface query data structure using a machine-learning model, wherein the information momentum multiplier is defined by a second user-input datum exceeding a pre-defined numerical threshold.

14. The method of claim 11, further comprising:
determining, by the at least a processor, an interface query data structure recommendation as a function of the interface query data structure and the user datum, wherein the interface query data structure recommendation comprises a record generated by the at least a processor.

15. The method of claim 14, further comprising:
generating, by the at least a processor, the interface query data structure as a function of a user-provided response received from the interface query data structure recommendation that is transmitted to the user; and
updating, by the at least a processor, the interface query data structure recommendation as a function of the user-provided response iteratively through a feedback loop.

16. The method of claim 11, further comprising:
generating, by the at least a processor, a machine-learning model for strategy data generation, wherein the machine-learning model is trained with training data comprising correlations between query data structures, user datums, and performance data outputs of the strategy data generation.

17. The method of claim 11, further comprising:
iteratively recalculating, by the at least a processor, the strategy data reflective of the dissimilarity using a machine-learning model such that the strategy data comprises data describing relatively more of the second user-input datum than the first user-input datum if the second user-input datum demonstrates dissimilarity to the first user-input datum.

18. The method of claim 11, further comprising:
displaying, by the at least a processor and the remote display device using the query interface data structure, a performance data output as a function of a user data change descriptor generated based on the second user-input datum.

19. The method of claim 11, wherein the at least a first user-input datum and the second user-input datum comprise at least an element of data describing a user-responsiveness factor defined as a frequency of the user in completing activities associated with a performance data output.

20. The method of claim 11, further comprising:
iteratively updating, by the at least a processor, a performance data output using a classifier of a machine learning model, which is further configured to classify data describing a frequency of the user completing activities describing a progress of the user toward matching the target to the strategy data.

* * * * *